US011361670B2

(12) United States Patent  
Robinson et al.

(10) Patent No.: US 11,361,670 B2  
(45) Date of Patent: Jun. 14, 2022

(54) AUGMENTED REALITY FOR VEHICLE OPERATIONS

(71) Applicants: Daniel Augustine Robinson, Marina Del Rey, CA (US); Nikola Vladimir Bicanic, Venice, CA (US); Glenn Thomas Snyder, Venice, CA (US)

(72) Inventors: Daniel Augustine Robinson, Marina Del Rey, CA (US); Nikola Vladimir Bicanic, Venice, CA (US); Glenn Thomas Snyder, Venice, CA (US)

(73) Assignee: RED SIX AEROSPACE INC., Santa Monica, CA (US)

( * ) Notice: Subject to any disclaimer, the term of this patent is extended or adjusted under 35 U.S.C. 154(b) by 0 days.

(21) Appl. No.: 17/466,035

(22) Filed: Sep. 3, 2021

(65) Prior Publication Data

US 2022/0058974 A1  Feb. 24, 2022

Related U.S. Application Data

(63) Continuation of application No. 17/085,809, filed on Oct. 30, 2020, which is a continuation-in-part of  
(Continued)

(51) Int. Cl.  
*G09B 9/44* (2006.01)  
*G09G 5/37* (2006.01)  
(Continued)

(52) U.S. Cl.  
CPC .......... *G09B 9/44* (2013.01); *G02B 27/0172* (2013.01); *G09G 5/10* (2013.01); *G09G 5/37* (2013.01);  
(Continued)

(58) Field of Classification Search  
CPC ............... G09B 9/44; G02B 27/0172; G02B 2027/014; G09G 5/10; G09G 5/37; G09G 2354/00; G09G 2380/12  
See application file for complete search history.

(56) References Cited

U.S. PATENT DOCUMENTS 5,838,262 A    11/1998  Kershner  
6,826,458 B2 * 11/2004  Horvath .............. G01C 23/00  
                                                    340/963  
(Continued)

OTHER PUBLICATIONS

Qllin Krum, Ordinary Pilots Are Closer to Getting Fighter Jet-Like Augmented Reality Displays, Aug. 31, 2015, Jalopnik {htlps:// jalopnik com/general-aviation-pilots-closer-to-getting-fighter-jet-1-1722914390}.  
(Continued)

*Primary Examiner* — Michael Le  
(74) *Attorney, Agent, or Firm* — FisherBroyles LLP

(57) ABSTRACT

An augmented reality system, includes a first head-mounted see-through optic and a second head-mounted see-through optic each adapted to present digital content viewable by a user and having a transparency that enables the user to see through to the surrounding environment, wherein the first and second optics are separated by a distance such that a user of the first cannot see a user of the second optic, a training simulation system adapted to present digital content to each of the first and second optics, wherein the digital content represents a vehicle operated by the other user, wherein the digital content is presented to the first optic at a geospatial position proximate the first optic and the training simulation system further adapted to move the geospatial position of the digital content to maintain an apparent position relative to the other vehicle based on the other vehicle's movements.

4 Claims, 16 Drawing Sheets

Related U.S. Application Data application No. 16/281,513, filed on Feb. 21, 2019, now Pat. No. 11,002,960, and a continuation-in-part of application No. 16/281,499, filed on Feb. 21, 2019, and a continuation-in-part of application No. 16/243,026, filed on Jan. 8, 2019.

(60) Provisional application No. 62/690,363, filed on Jun. 27, 2018, provisional application No. 62/663,883, filed on Apr. 27, 2018.

(51) Int. Cl.
*G09G 5/10* (2006.01)
*G02B 27/01* (2006.01)

(52) U.S. Cl.
CPC ... *G02B 2027/014* (2013.01); *G09G 2354/00* (2013.01); *G09G 2380/12* (2013.01)

(56) References Cited

U.S. PATENT DOCUMENTS

| | | | |
|---|---|---|---|
| 8,463,463 B1* | 6/2013 | Feldmann | G05D 1/104 701/3 |
| 9,099,009 B2 | 8/2015 | Sowadski | |
| 10,585,471 B2 | 3/2020 | Reichow | |
| 10,713,960 B1 | 7/2020 | Ziarnick | |
| 10,884,525 B1 | 1/2021 | Vonsik | |
| 10,977,493 B2 | 4/2021 | Speasl | |
| 10,996,473 B2 | 5/2021 | Yang | |
| 2002/0053983 A1 | 5/2002 | Chamas | |
| 2003/0025714 A1 | 2/2003 | Ebersole | |
| 2005/0231419 A1 | 10/2005 | Mitchell | |
| 2006/0178758 A1* | 8/2006 | Koriat | G09B 9/44 700/12 |
| 2007/0005199 A1* | 1/2007 | He | G01C 23/00 701/16 |
| 2008/0319647 A1 | 12/2008 | Dehn | |
| 2010/0096491 A1 | 4/2010 | Whitelaw | |
| 2010/0125412 A1 | 5/2010 | Suddreth | |
| 2010/0283635 A1 | 11/2010 | Brinkman | |
| 2011/0183301 A1 | 7/2011 | Turner | |
| 2012/0156653 A1* | 6/2012 | Wokurka | G09B 9/16 434/30 |
| 2012/0176497 A1 | 7/2012 | Shadmi | |
| 2012/0303252 A1 | 11/2012 | Schwinn | |
| 2013/0038510 A1 | 2/2013 | Brin | |
| 2013/0050070 A1 | 2/2013 | Lewis | |
| 2013/0162632 A1 | 6/2013 | Varga | |
| 2013/0280678 A1 | 10/2013 | Towers | |
| 2014/0080099 A1* | 3/2014 | Sowadski | G09B 9/44 434/37 |
| 2014/0127655 A1 | 5/2014 | Taylor | |
| 2014/0306866 A1 | 10/2014 | Miller | |
| 2015/0187224 A1 | 7/2015 | Moncrief | |
| 2015/0234455 A1 | 8/2015 | Lavalle | |
| 2015/0294505 A1* | 10/2015 | Atsmon | G06F 3/04815 345/633 |
| 2016/0019808 A1 | 1/2016 | Chavez | |
| 2016/0027336 A1 | 1/2016 | Towers | |
| 2016/0165409 A1 | 6/2016 | Bulut | |
| 2016/0195923 A1 | 7/2016 | Nauseef | |
| 2017/0030735 A1 | 2/2017 | Mohideen | |
| 2017/0109562 A1 | 4/2017 | Shroff | |
| 2017/0139205 A1 | 5/2017 | Lee | |
| 2017/0186240 A1 | 6/2017 | Alaniz | |
| 2017/0262052 A1 | 9/2017 | Richmond | |
| 2017/0308157 A1* | 10/2017 | Tsuda | G06F 3/011 |
| 2018/0096532 A1 | 4/2018 | Srivastav | |
| 2018/0130260 A1 | 5/2018 | Schmirler | |
| 2018/0155052 A1 | 6/2018 | Lacroix | |
| 2018/0190095 A1 | 7/2018 | Leegate | |
| 2018/0253856 A1 | 9/2018 | Price | |
| 2018/0272231 A1 | 9/2018 | Katoh | |
| 2019/0035258 A1 | 1/2019 | Zhang | |
| 2019/0212158 A1 | 7/2019 | Gordon | |
| 2019/0215671 A1 | 7/2019 | Takii | |
| 2019/0228590 A1 | 7/2019 | Kaifosh | |
| 2019/0317718 A1 | 10/2019 | George | |
| 2020/0151958 A1* | 5/2020 | Livneh | G06T 15/20 |

OTHER PUBLICATIONS

Michael William Gillen; A Study Evaluating if Targeted Training for Startle Effect can Improve Pilot Reactions in Handling U Unexpected Situations in a Flight Simulator; The University of North Dakota. ProQuest Dissertations Publishing, Dec. 1, 2016 (Year: 2016).

International Search Report dated Dec. 17, 2021, in International Application No. PCT/US2021/057357.

Written Opinion of the International Searching Authority dated Dec. 17, 2021, in International Application No. PCT/US2021/057357.

* cited by examiner

AUGMENTED REALITY FOR VEHICLE OPERATIONS

CROSS-REFERENCE TO RELATED APPLICATION

This application is a continuation of U.S. application Ser. No. 17/085,809, filed Oct. 30, 2020 and is a continuation-in-part of U.S. application Ser. No. 16/281,513, filed Feb. 21, 2019, is a continuation-in-part of U.S. application Ser. No. 16/281,499, filed Feb. 21, 2019, which claims the benefit of priority of U.S. Provisional Patent Application No. 62/690,363, filed Jun. 27, 2018, and of U.S. Provisional Patent Application No. 62/663,883, filed Apr. 27, 2018, and is a continuation-in-part of U.S. application Ser. No. 16/243,026, filed Jan. 8, 2019, which claims the benefit of priority of U.S. Provisional Patent Application No. 62/663,883, filed Apr. 27, 2018; the entire disclosures of each of which are hereby incorporated herein by reference.

FIELD OF THE INVENTION

The present disclosure relates generally to the field of augmented reality. More specifically, the present disclosure describes methods and systems using augmented reality in fast moving environments.

BACKGROUND OF THE INVENTION

Augmented reality systems generally use inside-out or outside-in tracking systems. These systems generally use objects in the environment as markers to assist in the tracking and to spatially locate content. There are environments where using such markers is difficult or not possible. Therefore, there is a need for improved augmented reality systems and methods.

SUMMARY

This summary is provided to introduce a selection of concepts in a simplified form, that are further described below in the Detailed Description. This summary is not intended to limit the claimed subject matter's scope.

In accordance with exemplary and non-limiting embodiments, an augmented reality system, comprises a first head-mounted see-through optic and a second head-mounted see-through optic each adapted to present digital content viewable by a user and having a transparency that enables the user to see through to the surrounding environment, wherein the first and second optics are separated by a distance such that a user of the first cannot see a user of the second optic, a training simulation system adapted to present digital content to each of the first and second optics, wherein the digital content represents a vehicle operated by the other user, wherein the digital content is presented to the first optic at a geospatial position proximate the first optic and the training simulation system further adapted to move the geospatial position of the digital content to maintain an apparent position relative to the other vehicle based on the other vehicle's movements.

In accordance with other exemplary and non-limiting embodiments, a method, comprises presenting a digital content to a first head-mounted see-through optic and a second head-mounted see-through optic the digital content viewable by a user and having a transparency that enables the user to see through to the surrounding environment, wherein the first and second optics are separated by a distance such that a user of the first cannot see a user of the second optic, presenting digital content to each of the first and second optics, wherein the digital content represents a vehicle operated by the other user, wherein the digital content is presented to the first optic at a geospatial position proximate the first optic and moving the geospatial position of the digital content to maintain an apparent position relative to the other vehicle based on the other vehicle's movements.

In accordance with other exemplary and non-limiting embodiments, a method of presenting a coordinated training scenario to two or more vehicles in separate airspaces where the two or more vehicles are not within visual range of one another, comprises presenting a common virtual airspace to the two or more vehicles, wherein the common virtual airspace includes a computer generated training asset that is viewable by an operator of each vehicle as content overlaying a real airspace surrounding each of the respective vehicles, identifying a geospatial location for each of the two or more vehicles within the virtual airspace and positioning the computer generated training asset at a geospatial location within the virtual airspace within a visual range of the two or more vehicles such that the perspective of the computer generated training asset is separately based on the geospatial location for each of the two or more vehicles.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
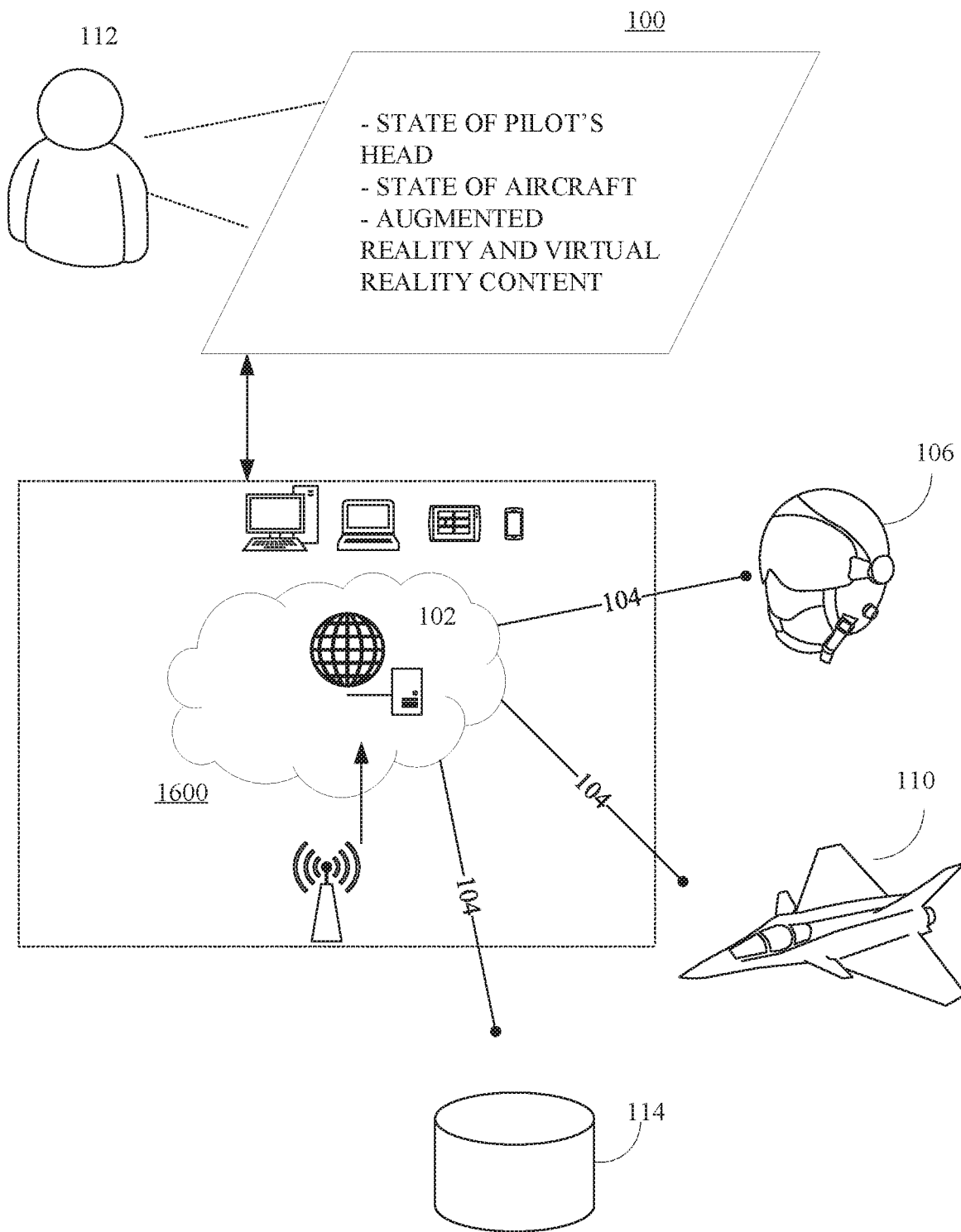
FIG. 1 is an illustration of an online platform in accordance with embodiments of the present disclosure.

While systems and methods are described herein in detail in relation to one or more embodiments, it is to be understood that this disclosure is illustrative and exemplary, and are made merely for the purposes of providing a written and enabling disclosure. The detailed disclosure herein is not intended, nor is to be construed, to limit the scope of patent protection afforded in any claim of a patent issuing here from, which scope is to be defined by the claims and the equivalents thereof.

The following detailed description refers to the accompanying drawings, which are incorporated herein.

Wherever possible, the same reference numbers are used in the drawings and the following description to refer to the same or similar elements. While specific embodiments of the disclosure may be described in detail, modifications, adaptations, and other implementations are foreseeable by the inventors. For example, substitutions, additions, or modifications may be made to the elements illustrated in the drawings, and the systems and methods described herein may be modified by substituting, reordering, or adding stages to the disclosed methods. Accordingly, the following detailed description does not limit the disclosure. Instead, the proper scope of the disclosure is defined by the appended claims. The present disclosure may contain headers. It should be understood that these headers are used as references and are not to be construed as limiting upon the subjected matter disclosed under the header.

The present disclosure includes many aspects and features. Moreover, while many aspects and features relate to, and are described in the context of augmented and/or virtual reality, embodiments of the present disclosure are not limited to use only in this context.

Location, Prediction, Presentation

The inventors discovered that augmented reality systems are not capable of locking geospatially located augmented reality content in a position within an environment that are absent real objects or has limited objects. Imagine that you are flying a plane at 10,000 feet above the ground. The pilot's view is wonderful, but it may absent any real objects that are geolocated with any precision. The pilot may see clouds, the sun, other planes temporarily, but the pilot does not see objects that are generally used to anchor content, such as walls, outdoor geolocated buildings, mapped roads, etc. The inventors further discovered that in such environments the systems, in embodiments, required precision location of the user, precision identification of where the user is looking and tracking of these attributes in real-time such that the geolocated content can be more precisely fixed in position. Add to this problem, as the inventor's discovered, that when presenting augmented reality content to a fast-moving vehicle in such an environment the issues get even more challenging. Systems and methods discovered by the inventors may be used in such environments or even in environments where there are real objects that could be used for anchoring of virtual content. Systems and methods in accordance with the principles of the present inventions may relate to a situation referred to as 'within visual range' of a vehicle. Training within visual range is generally training based on up to approximately 10 miles from an aircraft because that is approximately how far a pilot can see on a clear day. The training may involve presenting visual information in the form of augmented reality content to the pilot where the augmented reality content represents a training asset within the pilot's visual range.

Embodiments of the present invention may provide systems and methods for training of a pilot in a real aircraft while flying and performing maneuvers. Such a system may include an aircraft sensor system affixed to the aircraft adapted to provide a location of the aircraft, including an altitude of the aircraft, speed of the aircraft, and directional attitude of the aircraft, etc. The system may also include a head mounted display (HMD) sensor system (e.g. helmet position sensor system) adapted to determine a location of HMD within a cockpit of the aircraft and a viewing direction of a pilot wearing the helmet. The HMD may have a see-through computer display through which the pilot sees an environment outside of the aircraft with computer content overlaying the environment to create an augmented reality view of the environment for the pilot. The system may include a computer content presentation system adapted to present computer content to the see-through computer display at a virtual marker, generated by the computer content presentation system, representing a geospatial position of a training asset moving within a visual range of the pilot, such that the pilot sees the computer content from a perspective consistent with the aircraft's position, altitude, attitude, and the pilot's helmet position when the pilot's viewing direction is aligned with the virtual marker. The virtual marker may represent one in a series of geospatial locations that define the movement of the training asset and one of the series may be used as an anchor for the presentation of the virtual training asset content in a frame at a time representing a then current time.

In embodiments, the computer content represents a virtual asset in a training exercise for the pilot. The pilot may use the aircraft controls to navigate the aircraft in response to the virtual asset's location or movement. The computer content presentation system may receive information relating to the pilot's navigation of the aircraft and causes the virtual asset to react to the navigation of the aircraft. The reaction may be selected from a set of possible reactions and/or based on artificial intelligence systems. The virtual training asset may be a virtual aircraft, missile, enemy asset, friendly asset, ground asset, etc.

In embodiments, the augmented reality content's virtual marker's geospatial position is not associated with a real object in the environment. The environment may or may not have real objects in it, but the virtual marker may not be associated with the real object. The inventor's discovered that augmented reality content is generally locked into a location by using a physical object in the environment as an anchor for the content. For example, generally the content may be associated or 'connected' with a building, wall, street, sign, or other object that is either mapped to a location or not. A system or method according to the principles of the present invention may lock the content to a virtual marker in the air such that it can represent a virtual object can be presented as being in the air without being associated with an object in the environment. The apparent stability of such content, as viewed from an operator of a vehicle, may depend on maintaining an accurate geometric understanding of the relative position of the operator's HMD and the content virtual marker's geospatial location. A main cause of error in maintaining the geometric understanding may be maintaining an accurate understanding of the vehicle's position, attitude, speed, vibrations, etc. The geometric understanding between the vehicle and the geospatially located virtual marker may be accurate if the vehicle's location and condition is well understood. In embodiments, the geometric understanding changes quickly because both the vehicle and the virtual marker may be moving through the environment. For example, the vehicle may be a jet fighter aircraft moving at 800 miles per hour and the augmented reality content may represent an antiaircraft missile moving at 1500 miles an hour towards the aircraft. In such a training simulation both the real aircraft and virtual content are moving very fast and the relative geometry between them is changing even faster. A system and method according to the principles of the present invention update the relative geometric understanding describing the relationship between the vehicle and the virtual marker. The system may further include in the relative geometric understanding the vehicle operator's head location and viewing position and/or eye position. To maintain an accurate geometric understanding, a system and method may track information from sensors mounted within the vehicle, including a one or more sensors such as GPS, airspeed sensor, vertical airspeed sensor, stall sensor, IMU, G-Force sensor, avionics sensors, compass, altimeter, angle sensor, attitude heading and reference system sensors, angle of attack sensor, roll sensor, pitch sensor, yaw sensor, force sensors, vibration sensors, gyroscopes, engine sensors, tachometer, control surface sensors, etc.

Systems and methods according to the principles of the present inventions may include a helmet position sensor system that includes a plurality of transceivers affixed within the aircraft adapted to triangulate the location and viewing direction of the helmet. The plurality of transceivers may operate at an electromagnetic frequency outside the visible range. The helmet may include at least one marker adapted to be recognized by the triangulation system for the identification the helmet location and helmet viewing direction. For example, the helmet may have several markers on it at known positions and three or more electromagnetic transceivers may be mounted at known locations in the cockpit of an aircraft, or operator's environment in a vehicle. The transceivers each measure, through time of flight measurements, the distance between each transceiver and the marker(s) on the helmet and then the measurements may be used to triangulate the location and viewing position of the helmet. In embodiments, the helmet may be markerless and the triangulation system may 'image' the helmet to understand it's location and position.

Systems and methods according to the principles of the present inventions may include a helmet position sensor system that triangulates the helmet position by measuring a plurality of distances from the helmet (or other HMD) to known locations within the aircraft. This may generally be referred to as an inside out measurement. The known locations may include a material with a particular reflection characteristic that is matched with the transceiver system in the helmet.

As disclosed herein, the augmented reality content presented to an operator of a vehicle may be presented based on the physical environment that the vehicle is actually in or it may be based on a different environment such as an environment of another aircraft involved in the simulated training but is geographically remote from the operator. In such a situation, the virtual content presented to the operator may be influenced by the other vehicle's environment. For example, a first aircraft may be flying in a cloudy environment and a second aircraft may be flying in a bright sunny sky. The first aircraft may be presented a virtual environment based on the second aircraft's actual environment. While the pilot of the second aircraft may have to deal with the bright sun at times, the pilot of the first may not. The virtual content presentation system may present the same virtual training asset to both the first and second pilots, but the content may be faded to mimic a difficult to see asset due to the sun. The computer content may have a brightness and contrast, and at least one of the brightness and contrast may be determined by the pilot's viewing direction when the content is presented. The brightness or contrast may be reduced when the viewing direction is towards the sun.

A system and method according to the principles of the present inventions may involve presenting augmented reality content in an environment without relying on real objects in the environment or in environments without real objects. This may involve receiving a geospatial location, including altitude, of virtual content within an environment to understand where the virtual content is to be represented. It may also involve creating a content anchor point at the geospatial location. The system and method may further involve receiving sensor information from a real aircraft sensor system affixed to a real aircraft to provide a location of the aircraft including an altitude of the aircraft, speed of the aircraft, and directional attitude of the aircraft and receiving head position information identifying a viewing position of a pilot within the aircraft. With the virtual content location anchor point understood and the location and conditions of the real aircraft understood, augmented reality content may be presented in a see-through computer display worn by the pilot when the aircraft sensor data, helmet position data and content anchor point align indicating the pilot sees the anchor point.

A system and method according to the principles of the present inventions may involve two or more real airplanes operating in a common virtual environment where the pilot's of the respective airplane's are presented common augmented reality content from each's respective perspectives. In embodiments, a computer product, operating on one or more processors, adapted to present augmented reality content to a plurality of aircraft within a common virtual environment may include a data transmission system adapted to receive geospatial location data from the plurality of aircraft, wherein each of the plurality of aircraft is within visual proximity of one another. It may further involve a training simulation system adapted to generate a content anchor at a geospatial location within visual proximity of the plurality of aircraft in an environment. A content presentation system may be adapted to present computer-generated content representing a training asset moving within the visual proximity of the plurality of aircraft to each of the plurality of aircraft such that a pilot in each respective aircraft sees the computer-generated content at a perspective determined at least in part on the respective aircraft's location with respect to the anchor location.

A system and method according to the principles of the present inventions may involve two or more real airplanes operating in a common virtual environment where the pilot's of the respective airplane's are presented common augmented reality content from each's respective perspectives. In embodiments, a computer product, operating on one or more processors, adapted to present augmented reality content to a plurality of aircraft within a common virtual environment may include a data transmission system adapted to receive geospatial location data from the plurality of aircraft, wherein each of the plurality of aircraft is geographically separated such that they cannot see one another. Even though they cannot see one another, the training exercise and virtual environment may be configured such that they are virtually in close proximity. Each pilot may be able to 'see' the other plane by seeing an augmented reality representation of the other plane. It may further involve a training simulation system adapted to generate a content anchor at a geospatial location within visual proximity of the plurality of aircraft in an environment. A content presentation system may be adapted to present computer-generated content representing a training asset moving within the visual proximity of the plurality of aircraft to each of the plurality of aircraft such that a pilot in each respective aircraft sees the computer-generated content at a perspective determined at least in part on the respective aircraft's location with respect to the anchor location.

A system and method according to the principles of the present inventions may involve a simulated training environment with a moving anchor point for virtual content representing a moving augmented reality training asset. In embodiments, a computer product, operating on one or more processors, may be adapted to present augmented reality content to a pilot of an aircraft. A data transmission system may be adapted to receive geospatial location data from the aircraft as it moves through an environment. A training simulation system may be adapted to generate a series of content anchors at geospatial locations within visual proximity of the aircraft, each of the series of content anchors representing a geospatial position of a virtual training asset moving through the environment. A content presentation system may be adapted to present the virtual training asset to the aircraft such that a pilot in the aircraft sees the virtual training asset when it is indicated that the pilot viewing angle is aligned with a content anchor from the series of content anchors that represents a then current location of the virtual training asset. The virtual training asset is shaped in a perspective view consistent with the pilot's viewing angle and the then current location of the virtual training asset. For example, a series of progressively changing geospatial locations may represent a movement of a virtual training asset through a virtual environment over a period of time. The movement may be prescribed or pre-programmed and it may represent a sub-second period of time, second(s) period of time, minute(s) period of time, etc. The time period may represent a future period of time to describe how the virtual training asset is going to move in the future. When it becomes time to present the content to the augmented reality system in the aircraft the content may be located at one of the series of locations that represents the then current time to properly align the content. In embodiments, the selected location from the series of locations may be a time slightly in the future of the then current time to make an accommodation for latency in presenting the content.

A system and method according to the principles of the present inventions may involve a simulated training system where a virtual asset has a geospatial location that is independent of a real aircraft's location that is involved in the training. A system and method of presenting the simulated training exercise to a pilot in a real aircraft may involve generating a virtual environment that includes an indication of where the real aircraft is located and what its positional attitude is within the aircraft's real environment. It may further involve generating, within the virtual environment, a virtual asset that is within a visual range of the real aircraft's location and presenting the virtual asset to the pilot as augmented reality content that overlays the pilot's real view of the environment outside of the real aircraft, wherein the virtual asset is presented at a geospatial position that is independent of the real aircraft's location. In embodiments, the virtual asset may move in relation to the aircraft's location and maintain the virtual asset's autonomous movement and location with respect to the aircraft's location. While the virtual asset may react to the real aircraft's movements, the virtual asset may maintain its autonomous control.

The inventors discovered that predicting the future location(s) of a real vehicle that is moving through a real environment can improve the accuracy of the positioning of virtual content in an augmented reality system. This may be especially important when the real vehicle is moving quickly. A system and method in accordance with the principles of the present inventions may involve receiving a series of progressively changing content geospatial locations representing future movement of a virtual asset within a virtual environment, which may be predetermined and pre-programmed. It may also involve receiving a series of progressively changing real vehicle geospatial locations, each associated with a then current acquisition time, representing movement of a real vehicle in a real environment, wherein the virtual environment geospatially represents the real environment. The system and method may predict, based on the series of vehicle locations and related acquisition times, a future geospatial location, and series of future locations, of the vehicle. Then the augmented reality content may be presented to an operator of the vehicle at a position within a field-of-view of a see-through computer display based on the future geospatial location of the vehicle, or a location from the series of locations. It may further be based on the geospatial location of the virtual content, from the series of progressively changing content geospatial locations, representative of a time substantially the same as a time represented by the future geospatial location.

In embodiments, the prediction of the future geospatial location of the vehicle may be based at least in part on past geospatial vehicle locations identified by a sensor system affixed to the vehicle that periodically communicates a then current geospatial location; wherein the past geospatial vehicle locations are interpolated to form a past vehicle location trend. The prediction of the future geospatial location of the vehicle may then be further based on an extrapolation based at least in part on the past vehicle trend. The vehicle may be further represented by an attitude within the real environment and the virtual asset is represented by an attitude within the virtual environment and the presentation of the augmented reality content is further based on the attitude of the vehicle and the attitude of the virtual asset.

A system according to the principles of the present disclosure tracks an airplane's geospatial location (e.g.

through GPS) as it moves through the air. It also tracks inertial movements of the plane as well as the avionics in the plane; such as pilot controls for thrust, rudder, alerions, elevator, thrust direction, compass, airspeed indicator, external temperature, g-force meter, etc. With this data, a processor, either onboard or off-plane, can determine an accurate understanding of the plane's current condition, location, attitude, speed, etc. Such processed data can be tracked over time such that a trend analysis can be performed on the data in real time. This real time trend analysis can further be used to predict where the plane is going to be at a future point in time. For example, the plane's data may be collected every 4 ms and a saved data set may include thousands of points representing the immediate past. The data set can then be used to accurately predict where the plane is going to be in the relative near future (e.g. in the next milliseconds, seconds, minutes). The extrapolated future location prediction based on the past data gets less precise the further into the future the prediction is making. However, the augmented reality content is being presented to a see-through optic at a fast refresh rate such that the position of the content in the optic can be based on the millisecond or second level predictions. As a further example, the refresh rate from a software product that is generating and producing the virtual content rendering (e.g. a gaming engine) may be on the order of 4 ms to 12 ms. This means that the position of the content can be shifted to accommodate a predicted location and pilot visions direction every 4 ms to 12 ms. Knowing the plane's weight and performance characteristics may also be used in the calculations. For example, the processor may factor in that an F-22 fighter jet weight just over 40,000 pounds and can make a 5G turn at 1,000 miles per hour and understand what the flight path of such a maneuver may look like. Such flight path characteristics would be quite different in an F-16, Harrier, F-35, Cargo plane, etc.

In embodiments, a system may be equipped with a computer processor to read sensor data from the vehicle (e.g. airplane, ground vehicle, space vehicle, etc.) to locate the vehicle and understand its current conditions (e.g. forces, avionics, environment, attitude, etc.). The processor may store the sensor data and evaluate the sensor data. The type of vehicle and/or its powered movement characteristics may be stored and used in conjunction with the sensor data to further understand the present condition of the vehicle. The current and past sensor data and movement characteristics may be fused and analyzed to understand the past performance of the vehicle and this trend analysis may be further used to predict a future position of the vehicle. With the very near future position of the vehicle predicted with precision, virtual content can be presented to the see-through optical system used by a user such that it aligns with a geospatial location of geospatially located content. For example, when the system predicts a location of an airplane one second from now it will be a very accurate prediction. With the accurate prediction of the future location and knowing the future geospatial positioning of the content (e.g. longitude, latitude, and altitude) the virtual content can be positioned relative to the position of the airplane at the future time. The relative, or near absolute, positioning of the content can be refreshed at a very fast rate (e.g. 4 ms). This is fast enough to accommodate the fast repositioning of the fast reposition of the virtual content (e.g. another plane approaching from the opposite direction).

The inventors further discovered that the head and/or eye position of the operator or passenger of the vehicle needs to be well understood as it relates to the position of the vehicle. For example, with an airplane moving at 1,000 miles an hour and its location and condition well understood (as described herein) it is not enough to determine the relative position of the geospatial content. The content needs to be presented in the see-through optic at a correct position such that the user perceives that it as being in the proper geospatial position. In a system where the see-through optic is attached to the vehicle surrounding the user's view of the exterior environment, the relative positioning of the content may require an understanding of the user's eye height since the optic is not moving relative to the vehicle. In a system where the see-through optic is attached to the user (e.g. head mounted display ("HMD"), in a helmet, etc.) the position of the user's head will be considered. For example, if the virtual content is on the right side of the vehicle and the user is looking out the left side of the vehicle, the content should not be presented to the see-through optic because the user cannot see the geospatial location anchoring the content. As the user turns her head to view the anchor point the content will be presented at a location within the optic that correlates with a virtual line connecting her position within the vehicle and the anchor position.

In embodiments, the user's head position may be derived using an inside-out (e.g. where an HMD emits electromagnetic energy to measure distances to objects within a user environment and then determining position through triangulation), outside-in (e.g. where there are electromagnetic energy emitters set at known locations within the user's environment and use distance measurements from the emitters to the HMD to triangulate), mechanical system, electrical system, wireless system, wired system, etc. For example, an outside-in system in a cockpit of a jet fighter may use electromagnetics to triangulate the head position using emitters located at known positions within the cockpit. The helmet or other HMD may have markers or be markerless. Marks on the helmet may be used to identify the user's direction of vision. A markerless HMD may be programmed to understand the electromagnetic signature of the HMD such that its viewing position can be derived.

A system may also include an eye tracking system to identify the direction of the user's eyes. This can be used in conjunction with the head position data to determine the general direction the user is looking (e.g. through head position tracking) and specific direction (e.g. through eye position). This may be useful in conjunction with a foveated display where the resolution of the virtual content is increased in the specific direction and decreased otherwise. The acuity of the human eye is very high within a very narrow angle (e.g. 1 or 2 degrees) and it quickly falls off outside of the narrow angle. This can mean that content outside of the high acuity region can be decreased in resolution or sharpness because it is going to be perceived as 'peripheral vision' and it can save processing power and decrease latency because potentially less data is used to render and present content.

In embodiments, an augmented reality system used by an operator of a vehicle may make a precision prediction of the vehicle's future geospatial location, orientation, angular position, attitude, direction, speed (this collection of attributes or sub set of attributes or other attributes describing the vehicle within an environment is generally referred to as the vehicle's condition herein), and acceleration based on the vehicle's past performance of the same factors, or subset or other set of factors, leading up to the vehicle's current state. Including an understanding of the vehicle's capabilities and abilities throughout a range of motions, speeds, accelerations, etc. can assist in the future prediction. Such an augmented reality system may employ artificial intelligence, machine language and the like to make the prediction based on such data collected over time. Such system may further include an error prediction and include limits on how much error is tolerable given the current situation. For example, the augmented reality system may be able to predict the future position and geometry with great accuracy for three second in the future. At a frame rate of 10 ms that means three hundred frames of virtual content can be 'locked in' as to its location and geometry. If the prediction after three seconds and less than five second, for example, is reasonably predictable, the frames to be generated in that period may be rendered from one perspective (e.g. the geometry may be fixed) but not 'locked in' from another (e.g. the location may be approximate to be updated when it gets to the three second prediction point in the data stream. This means you could have three hundred frames locked in and completely available for presentation along with another two hundred frames that are partially rendered in some way. Optional rendering could also be produced if the future prediction system developed more than one alternative path for the vehicle. A method allowing the future rendering of content within a gaming engine could reduce the latency of presenting the content to the see-through optic.

The future location/geometric position/condition prediction systems described herein are very useful when used in fast moving vehicles. A jet aircraft may travel at speeds of 1,300 miles per hour. That is equivalent to 1.9 feet per millisecond. If the content rendering system has a content data output rate of 10 ms, that means there could be 19 feet traveled between frames. That could lead to significant misplacement or poor rendering of the geometry, orientation, etc. of the virtual content if a future prediction of the vehicle's location, geometric position, and condition is not used to impact the generation of the content. Even at much slower speeds the error produced without the future prediction may be significant. Cutting the speed down from 1300 miles per hour to 130 miles per hour could still lead to a near two-foot error between frames in content rendering and placement. Even at highway speed of 65 miles per hour, a one-foot error could be produced.

The future prediction of the vehicle's location and condition may be made to provide processing time before presenting the virtual content. It may further be made such that when the content is ready for presentation the content can be positioned properly within the see-through optic.

An augmented reality system and method in accordance with the principles of the present disclosure may include a geospatial location system adapted to identify a current location of a vehicle (e.g. GPS), a plurality of sensors adapted to identify the vehicle's positional geometry within an environment (e.g. inertial measurement unit (IMU), G-Force sensor, compass) at the current location, a plurality of sensors adapted to identify vectors of force being applied to the vehicle (e.g. IMU, G-Force sensor); a data association and storage module (e.g. a computer processor with memory) adapted to associate and store the geospatial location data, positional geometry data, and force vector data with a time of acquisition of each type of data, a computer processor adapted to analyze the stored data and generate a trend of the vehicle's positions and conditions over a period of time and extrapolate the trend into a future period of time to produce a future predicted performance, wherein the processor is further adapted (e.g. programmed to execute) to present geospatially located augmented reality content to an operator of the vehicle based on the future predicted performance. The presentation of content based on the future predicted performance is estimated to be presented at a time corresponding with the then current time and location. In other words, the future prediction is used to determine the location and condition of the vehicle in the future, and presentation of the content is done using the prediction of location and condition that is timestamped with the then current time or nearest then current time.

The system and method may further include a head position tracking system adapted to identify a viewing direction of a user of an augmented reality see-through computer display, wherein the presentation of the geospatially located content is further based on the viewing direction of the user. The presentation of the geospatially located content may also involve positioning the content within a field-of-view of the see-through computer display based on the viewing direction of the user. The system and method may further comprise an eye direction detection system (e.g. a camera system or other sensor system for imaging and tracking the position and movement of the user's eyes, wherein the presentation of the geospatially located content within the field-of-view is further based on a measured eye position, direction, or motion of the user.

Figure 2:
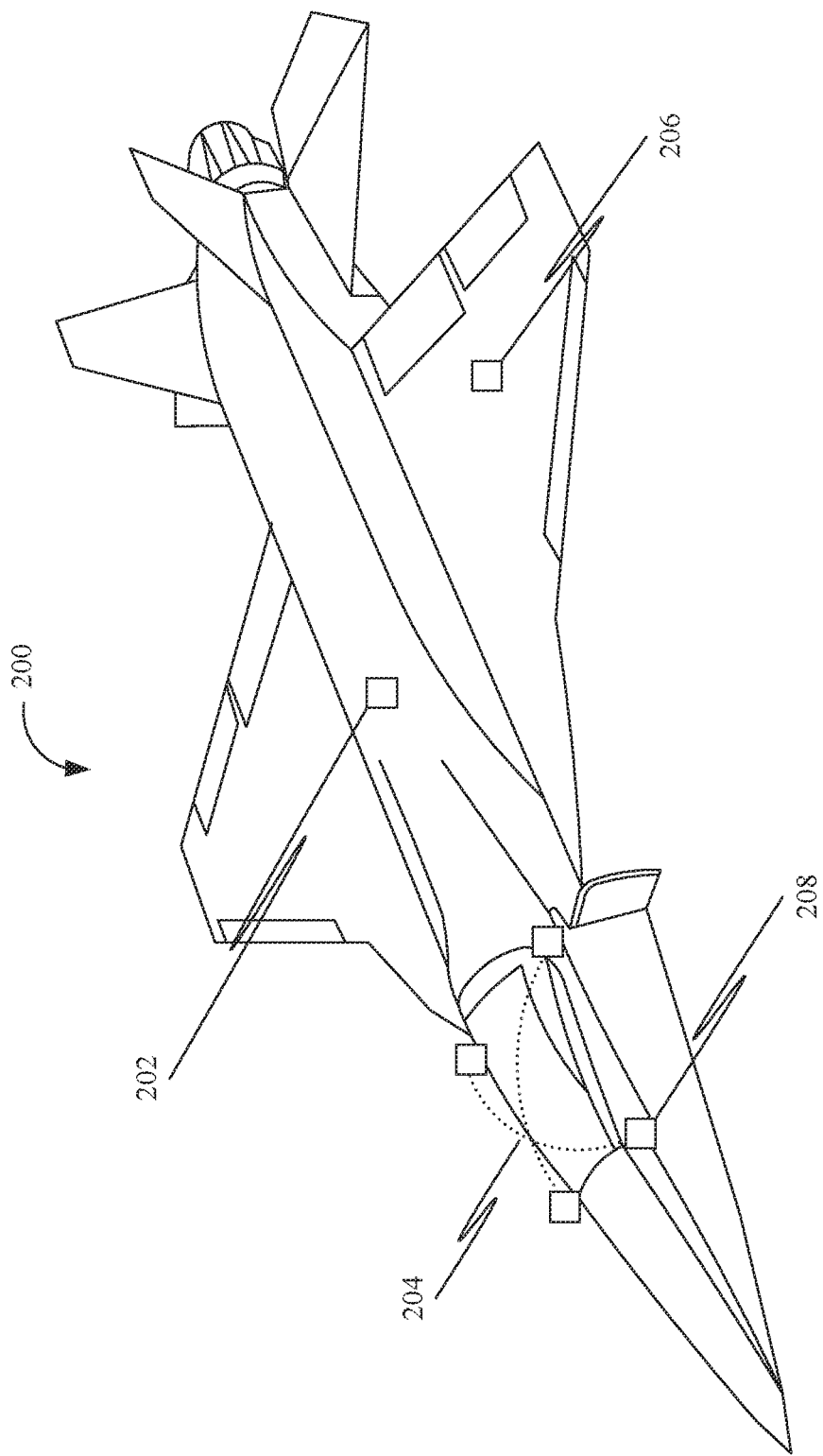
FIG. 2 illustrates a system to allow real pilots in real aircraft using augmented reality to meet in a virtual piece of airspace, in accordance with embodiments of the present disclosure.

FIG. 1 is an illustration of an online platform 100 consistent with various embodiments of the present disclosure. By way of non-limiting example, the online platform 100 to allow real pilots in real aircraft using augmented and virtual reality to meet in a virtual piece of airspace may be hosted on a centralized server 102, such as, for example, a cloud computing service. The centralized server 102 may communicate with other network entities, such as, for example, an augmented and virtual reality display device 106, a sensor system 110 of an aircraft (such as an aircraft 200, as shown in FIG. 2), database 114 (such as, 3D model database), over a communication network 104, such as, but not limited to, the Internet. Accordingly, in some instances, the augmented and virtual reality display device 106 operated by a pilot (a user 112) may be in communication with the online platform 100. Further, the sensor system 110 of the aircraft 200 may be in communication with the online platform 100. All communication between the augmented and virtual reality display device 106 and the sensor system 110 with the online platform 100 may be carried via radio waves. For example, Aircraft Communications Addressing and Reporting System (ACARS) may be used for communication between the augmented and virtual reality display device 106 or the sensor system 110, and the online platform 100.

Further, the centralized server 102 may include one or more servers; for example, a master server and one or more local servers. The one or more servers may be stationed on one or more of the aircraft, the ground and a satellite orbiting the earth (such as Satcom and Iridium satellites). Further, as shown in FIG. 2, the aircraft 200 may include a Remote Artificial Intelligence Link (RAIL) 202 for communication with the centralized server 102. Further, the AI-driven processing and the graphics generation may be performed on the centralized server 102.

The augmented and virtual reality display device 106 may display content to a pilot flying the aircraft 200. The augmented and virtual reality display device 106 may be one of a head-mounted display (HMD), Eyeglasses, head-up display (HUD), smart contact lenses, Virtual retinal display, EyeTap, and cockpit glass. In some embodiments, the augmented and virtual reality display device 106 may be integrated with a flight helmet of a pilot. As shown in FIG. 2, an Enhanced Visual Environment (EVE) 204 may be configured to provide high fidelity/wide field of view content to the augmented and virtual reality display device 106.

The sensor system 110 of the aircraft 200 may include one or more internal sensors to track and localize the pilot's head within the cockpit of the aircraft 200. Further, the sensor system 110 of the aircraft 200 may include one or more external sensors to track the position and orientation of the aircraft 200. As shown in FIG. 2, an Avionics Integration System (AIS) 206 may be configured to provide accurate six degrees of freedom positioning of aircraft 200. The six degrees of freedom include longitudinal (forward and backward thrust), vertical (aircraft moves upward and downward), lateral (aircraft moves from side to side), pitch (nose pitches up or down), roll (wings roll up or down) and yaw (nose moves from side to side).

Data fusion can be an important feature of systems according to embodiments of this disclosure. A processor may need to read data from several different sources in the process of determining a vehicle's current location and condition. The processor may further send data representing the predictions to a content rendering system. The processor may further have to receive renderings from the rendering system and then present the rendering to an HMD at the right time to match the then current position and condition of the vehicle. This may be referred to as data fusion. To make the timing of the presentation of content even more complicated, as the inventors further discovered, data upon which a location/condition prediction might be made may have refresh rates that may be different and the content rendering refresh rate may be different and any of it may possibly have variable refresh rates.

In embodiments, the augmented reality system, through a processor, produces a prediction of the future location and condition of a vehicle over a future time period. The future time period may include discrete data points at discrete time intervals. The intervals may be coordinated with the incoming data refresh rates. The processor may interpolate data between the discrete points in time to provide a higher resolution prediction. This may be useful in situations where the rendering engine has a variable or different refresh rate from the data being used for the vehicle's predicted future position and condition. For example, the data used to predict the location and condition of the vehicle may have a refresh rate of 5 ms and the rendering engine may have a variable refresh rate of between 4 and 12 ms. The processor might then interpolate between the discrete future positions and conditions such that when the content does arrive for presentation it knows the vehicle's then current predicted state in a predictable resolution.

In embodiments, a processor may interpolate each data type within its own refresh rate such that several data types with different refresh rates can be merged at common timestamps. The merged data may then be analyzed to generate a trend of the vehicle's locations and conditions. This trend may be analyzed and extrapolated to predict future locations and conditions of the vehicle.

Further, as shown in FIG. 2, Coupled Fusion Tracking (CFT) 208 may be employed to combine the data received from the one or more internal sensors and the one or more external sensors to provide a highly usable augmented reality solution in a fast-moving environment. Further, the CFT 208 may integrate both virtual reality and augmented reality to provide robust augmented reality visuals within a dynamic environment. For example, the CFT 208 may allow for drawing an accurate picture of an enemy aircraft in augmented and virtual reality display device 106 worn by a pilot.

The user 112 may access online platform 100 through any useful user interface (e.g. software application, browser, etc. The software application may be embodied as, for example, but not be limited to, a software user interface, network interface, website, web application, desktop application, augmented reality application, virtual reality application, mobile application compatible with a computing device 1600, etc.

Systems and methods described herein may be used to provide a common virtual environment to more than one person in more than one vehicle. This may be referred to generally as a common virtual environment, coordinated virtual environment or virtual environment. A common virtual environment may or may not be presented in a single geospatial environment. When two jet fighters are practicing maneuvers together in the same airspace (e.g. where the pilots of two planes have the ability to see one another) the common virtual environment may represent the airspace they occupy. If, on the other hand, two jet fighters are practicing maneuvers in separate airspaces (e.g. where the two pilots never actually see one another) the common virtual environment may represent one of their airspaces, neither of their airspaces, etc. In each case, the presentation of virtual content in the common virtual environment may involve understanding the geospatial location and condition of each plane such that the common virtual environment can be presented from the correct perspective in each plane.

There could be many real vehicles and people within a common virtual environment. There may be a number of planes, ground vehicles and people participating in a training session, game, or other activity. Each would be seeing the common virtual environment from their own perspective through their own HMD. Each vehicle may have a system as described herein to track the vehicles' location and condition to predict its future location and condition for the placement of virtual content in its associated see-through optical system. Further, each vehicle and/or HMD may have a head and/or eye tracking system upon which the content position may in part depend.

Systems and methods according to the principles of the present invention may involve training a plurality of pilots, each in a separate real aircraft, where the plurality of separate aircraft share a common physical environment. This may be useful in a training situation where two or more planes are flying in close proximity and are being presented with a common enemy asset in augmented reality. This could be a dog fight, missile aversion, target bombing, etc. Such systems and methods may include providing a head mounted see-through computer display (HMD) to each of the plurality of pilots such that each of the plurality of pilots can view a common virtual environment with computer rendered training content. Each of the aircraft may track and report its own location, attitude, speed, or other information to a computer simulation system such that the simulation system can manage the training simulation. The simulation system may position the computer rendered training content at a geospatial location within a visual range of each of the plurality of pilots or one of the pilots and the content may be presented to the HMD of each of the plurality of pilots, wherein the presentation in each individual HMD is dependent on an alignment of each respective HMD and the computer rendered content geospatial location.

In embodiments, the computer rendered training content presented to each HMD is rendered with its own unique perspective based on the angle from which each HMD views the geospatial location. In this example, each of the plurality of pilots has the ability to see another of the plurality of aircraft through their HMD, forming an augmented reality training environment comprising a see through view of the real environment for each pilot augmented by the computer rendered training content presented in the common virtual environment. Each of the plurality of pilots may be in communication with the other pilots such that the pilots can navigate their separate real aircraft in coordination in response to the computer rendered training content.

Systems and methods according to the principles of the present invention may involve presenting a plurality of pilots of separate aircraft with a common augmented reality environment where common computer generated content is positioned and each of the plurality of pilots sees the common computer generated content from at a perspective based on their respective locations and aircraft's attitude. Each of the pilots may be able to communicate with the other pilots such that they can coordinate navigation maneuvers with respect to the computer generated content.

In embodiments, the computer generated content may be a representation of an enemy asset, wherein the enemy asset is programmed to engage with at least one of the separate aircraft. The computer generated content may represent a plurality of independently controlled enemy assets, wherein each of the a plurality of independently controlled enemy asset is programmed to engage with at least one of the separate aircraft. This may simulate a coordinated enemy, which may require team navigation and coordination.

In embodiments, the presentation of the computer generated content to each of the plurality of pilots may be based on an alignment between each of the plurality of pilots viewing direction and the computer generated content's geospatial location such that each pilot sees the computer generated content when each pilot's aircraft position, pilot viewing direction and the content's geospatial location align in an unobstructed line of sight. For example, if a plane is flying level and within visual range of the content's geospatial location, the pilot may see the content if it is in front of the plane and above the plane horizon such that the pilot can see the geospatial location through the cockpit window. If, on the other hand, the content is directly behind the plane and the pilot cannot turn his head to view the geospatial location of the content, than the content may not be presented in the pilot's HMD.

Figure 3:
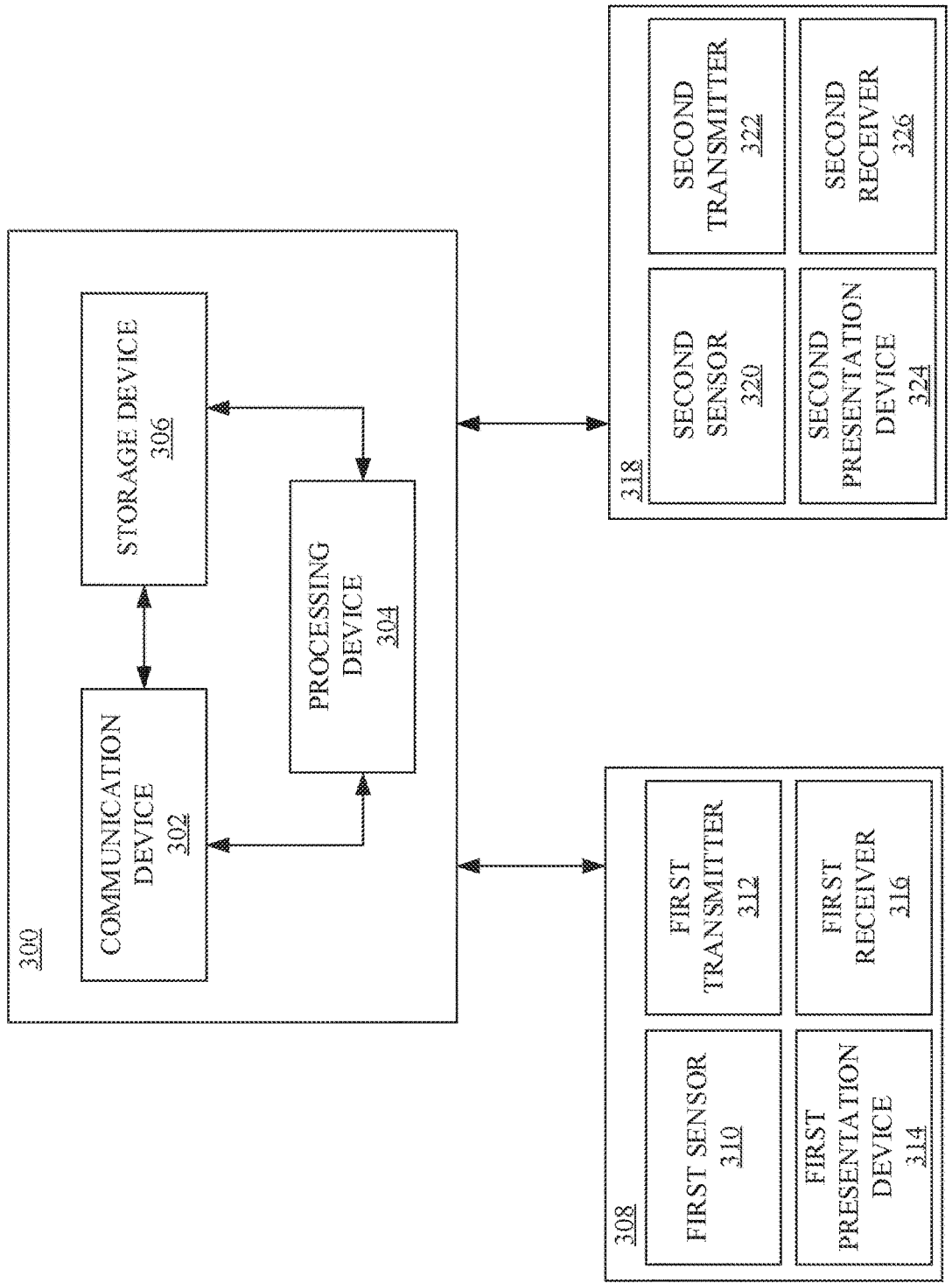
FIG. 3 is a block diagram of a system for facilitating provisioning of a virtual experience, in accordance with embodiments of the present disclosure.

FIG. 3 is a block diagram of a system 300 for facilitating provisioning of a virtual experience in accordance with some embodiments. The system 300 may include a communication device 302, a processing device 304 and a storage device 306.

The communication device 302 may be configured for receiving at least one first sensor data corresponding to at least one first sensor 310 associated with a first vehicle 308. Further, the at least one first sensor 310 may be communicatively coupled to a first transmitter 312 configured for transmitting the at least one first sensor data over a first communication channel. In some embodiments, the first vehicle 308 may be a first aircraft. Further, a first user may be a first pilot.

Further, the communication device 302 may be configured for receiving at least one second sensor data corresponding to at least one second sensor 320 associated with a second vehicle 318. Further, the at least one second sensor 320 may be communicatively coupled to a second transmitter 322 configured for transmitting the at least one second sensor data over a second communication channel. In some embodiments, the second vehicle 318 may be a second aircraft. Further, a second user may be a second pilot.

In some embodiments, the at least one first sensor data may be received from a first On-Board-Diagnostics (OBD) system of the first vehicle 308, the at least one second sensor data may be received from a second On-Board-Diagnostics (OBD) system of the second vehicle 318.

Further, the communication device 302 may be configured for transmitting at least one first presentation data to at least one first presentation device 314 associated with the first vehicle 308. Further, the at least one first presentation device 314 may include a first receiver 316 configured for receiving the at least one first presentation data over the first communication channel. Further, the at least one first presentation device may be configured for presenting the at least one first presentation data.

Further, the communication device 302 may be configured for transmitting at least one second presentation data to at least one second presentation device 324 associated with the second vehicle 318. Further, the at least one second presentation device 324 may include a second receiver 326 configured for receiving the at least one second presentation data over the second communication channel. Further, the at least one second presentation device may be configured for presenting the at least one second presentation data.

Further, the processing device 304 may be configured for generating the at least one first presentation data based on the at least one second sensor data.

Further, the processing device 304 may be configured for generating the at least one second presentation data based on the at least one first sensor data.

Further, the storage device 306 may be configured for storing each of the at least one first presentation data and the at least one second presentation data.

In some embodiments, the at least one first sensor 310 may include one or more of a first orientation sensor, a first motion sensor, a first accelerometer, a first location sensor, a first speed sensor, a first vibration sensor, a first temperature sensor, a first light sensor and a first sound sensor. Further, the at least one second sensor 320 may include one or more of a second orientation sensor, a second motion sensor, a second accelerometer, a second location sensor, a second speed sensor, a second vibration sensor, a second temperature sensor, a second light sensor and a second sound sensor.

In some embodiments, the at least one first sensor 310 may be configured for sensing at least one first physical variable associated with the first vehicle 308. Further, the at least one second sensor 320 may be configured for sensing at least one second physical variable associated with the second vehicle. In further embodiments, the at least one first physical variable may include one or more of a first orientation, a first motion, a first acceleration, a first location, a first speed, a first vibration, a first temperature, a first light intensity and a first sound. Further, the at least one second physical variable may include one or more of a second orientation, a second motion, a second acceleration, a second location, a second speed, a second vibration, a second temperature, a second light intensity and a second sound.

In some embodiments, the at least one first sensor 310 may include a first environmental sensor configured for sensing a first environmental variable associated with the first vehicle 308. Further, the at least one second sensor 320 may include a second environmental sensor configured for sensing a second environmental variable associated with the second vehicle.

In some embodiments, the at least one first sensor 310 may include a first user sensor configured for sensing a first user variable associated with a first user of the first vehicle 308. Further, the at least one second sensor 320 may include a second user sensor configured for sensing a second user variable associated with a second user of the second vehicle 318.

In further embodiments, the first user variable may include a first user location and a first user orientation. Further, the second user variable may include a second user location and a second user orientation. Further, the first presentation device may include a first head mount display. Further, the second presentation device may include a second head mount display.

In further embodiments, the first head mount display may include a first user location sensor of the at least one first sensor 310 configured for sensing the first user location and a first user orientation sensor of the at least one first sensor 310 configured for sensing the first user orientation. The first head mount display is explained in further detail in conjunction with FIG. 4 below. Further, the second head mount display may include a second user location sensor of the at least one second sensor 320 configured for sensing the second user location, a second user orientation sensor of the at least one second sensor 320 configured for sensing the second user orientation.

In further embodiments, the first vehicle 308 may include a first user location sensor of the at least one first sensor 310 configured for sensing the first user location and a first user orientation sensor of the at least one first sensor 310 configured for sensing the first user orientation. Further, the second vehicle 318 may include a second user location sensor of the at least one second sensor 320 configured for sensing the second user location, a second user orientation sensor of the at least one second sensor 320 configured for sensing the second user orientation.

In further embodiments, the first user orientation sensor may include a first gaze sensor configured for sensing a first eye gaze of the first user. Further, the second user orientation sensor may include a second gaze sensor configured for sensing a second eye gaze of the second user.

In further embodiments, the first user location sensor may include a first proximity sensor configured for sensing the first user location in relation to the at least one first presentation device 314. Further, the second user location sensor may include a second proximity sensor configured for sensing the second user location in relation to the at least one second presentation device 324.

In some embodiments, the first head mount display may include a first see-through display device. Further, the second head mount display may include a second see-through display device.

In some embodiments, the first head mount display may include a first optical marker configured to facilitate determination of one or more of the first user location and the first user orientation. Further, the at least one first sensor 310 may include a first camera configured for capturing a first image of the first optical marker. Further, the at least one first sensor 310 may be communicatively coupled to a first processor associated with the vehicle. Further, the first processor may be configured for determining one or more of the first user location and the first user orientation based on analysis of the first image. Further, the second head mount display may include a second optical marker configured to facilitate determination of one or more of the second user location and the second user orientation. Further, the at least one second sensor 320 may include a second camera configured for capturing a second image of the second optical marker. Further, the at least one second sensor 320 may be communicatively coupled to a second processor associated with the vehicle. Further, the second processor may be configured for determining one or more of the second user location and the second user orientation based on analysis of the second image.

In some embodiments, the first presentation device may include a first see-through display device disposed in a first windshield of the first vehicle 308. Further, the second presentation device may include a second see-through display device disposed in a second windshield of the second vehicle 318.

In some embodiments, the first vehicle 308 may include a first watercraft, a first land vehicle, a first aircraft and a first amphibious vehicle. Further, the second vehicle 318 may include a second watercraft, a second land vehicle, a second aircraft and a second amphibious vehicle.

In some embodiments, the at least one first presentation data may include one or more of a first visual data, a first audio data and a first haptic data. Further, the at least one second presentation data may include one or more of a second visual data, a second audio data and a second haptic data.

In some embodiments, the at least one first presentation device 314 may include at least one environmental variable actuator configured for controlling at least one first environmental variable associated with the first vehicle 308 based on the first presentation data. Further, the at least one second presentation device 324 may include at least one environmental variable actuator configured for controlling at least one second environmental variable associated with the second vehicle 318 based on the second presentation data. In further embodiments, the at least one first environmental variable may include one or more of a first temperature level, a first humidity level, a first pressure level, a first oxygen level, a first ambient light, a first ambient sound, a first vibration level, a first turbulence, a first motion, a first speed, a first orientation and a first acceleration, the at least one second environmental variable may include one or more of a second temperature level, a second humidity level, a second pressure level, a second oxygen level, a second ambient light, a second ambient sound, a second vibration level, a second turbulence, a second motion, a second speed, a second orientation and a second acceleration.

In some embodiments, the first vehicle 308 may include each of the at least one first sensor 310 and the at least one first presentation device 314. Further, the second vehicle 318 may include each of the at least one second sensor 320 and the at least one second presentation device 324.

In some embodiments, the storage device 306 may be further configured for storing a first three-dimensional model corresponding to the first vehicle 308 and a second three-dimensional model corresponding to the second vehicle 318. Further, the generating of the first presentation data may be based on the second three-dimensional model. Further, the generating of the second presentation data may be based on the first three-dimensional model.

In some embodiments, the communication device 302 may be further configured for receiving an administrator command from an administrator device. Further, the generating of one or more of the first presentation data and the second presentation data may be based on the administrator command. In further embodiments, the at least one first presentation data may include at least one first virtual object model corresponding to at least one first virtual object. Further, the at least one second presentation data may include at least one second virtual object model corresponding to at least one second virtual object. Further, the generating of the at least one first virtual object model may be independent of the at least one second sensor model. Further, the generating of the at least one second virtual object model may be independent of the at least one first sensor model. Further, the generating of one or more of the at least one first virtual object model and the at least one second virtual object model may be based on the administrator command. Further, the storage device 306 may be configured for storing the at least one first virtual object model and the at least one second virtual object model.

In further embodiments, the administrator command may include a virtual distance parameter. Further, the generating of each of the at least one first presentation data and the at least one second presentation data may be based on the virtual distance parameter.

In further embodiments, the at least one first sensor data may include at least one first proximity data corresponding to at least one first external real object in a vicinity of the first vehicle 308. Further, the at least one second sensor data may include at least one second proximity data corresponding to at least one second external real object in a vicinity of the second vehicle 318. Further, the generating of the at least one first presentation data may be based on the at least one second proximity data. Further, the generating of the at least one second presentation data may be based on the at least one first proximity data. In further embodiments, the at least one first external real object may include a first cloud, a first landscape feature, a first man-made structure and a first natural object. Further, the at least one second external real object may include a second cloud, a second landscape feature, a second man-made structure and a second natural object.

In some embodiments, the at least one first sensor data may include at least one first image data corresponding to at least one first external real object in a vicinity of the first vehicle 308. Further, the at least one second sensor data may include at least one second image data corresponding to at least one second external real object in a vicinity of the second vehicle 318. Further, the generating of the at least one first presentation data may be based on the at least one second image data. Further, the generating of the at least one second presentation data may be based on the at least one first image data.

In some embodiments, the communication device 302 may be further configured for transmitting a server authentication data to the first receiver 316. Further, the first receiver 316 may be communicatively coupled to first processor associated with the first presentation device. Further, the first processor may be communicatively coupled to a first memory device configured to store a first authentication data. Further, the first processor may be configured for performing a first server authentication based on the first authentication data and the server authentication data. Further, the first processor may be configured for controlling presentation of the at least one first presentation data on the at least one first presentation device 314 based on the first server authentication. Further, the communication device 302 may be configured for transmitting a server authentication data to the second receiver 326. Further, the second receiver 326 may be communicatively coupled to second processor associated with the second presentation device. Further, the second processor may be communicatively coupled to a second memory device configured to store a second authentication data. Further, the second processor may be configured for performing a second server authentication based on the second authentication data and the server authentication data. Further, the second processor may be configured for controlling presentation of the at least one second presentation data on the at least one second presentation device 324 based on the second server authentication. Further, the communication device 302 may be configured for receiving a first client authentication data from the first transmitter 312. Further, the storage device 306 may be configured for storing the first authentication data. Further, the communication device 302 may be configured for and receiving a second client authentication data from the second transmitter 322. Further, the storage device 306 may be configured for storing the second authentication data. Further, the processing device 304 may be further configured for performing a first client authentication based on the first client authentication data and the first authentication data. Further, the generating of the at least one second presentation data may be further based on the first client authentication. Further, the processing device 304 may be configured for performing a second client authentication based on the second client authentication data and the second authentication data. Further, the generating of the at least one first presentation data may be further based on the second client authentication.

Figure 4:
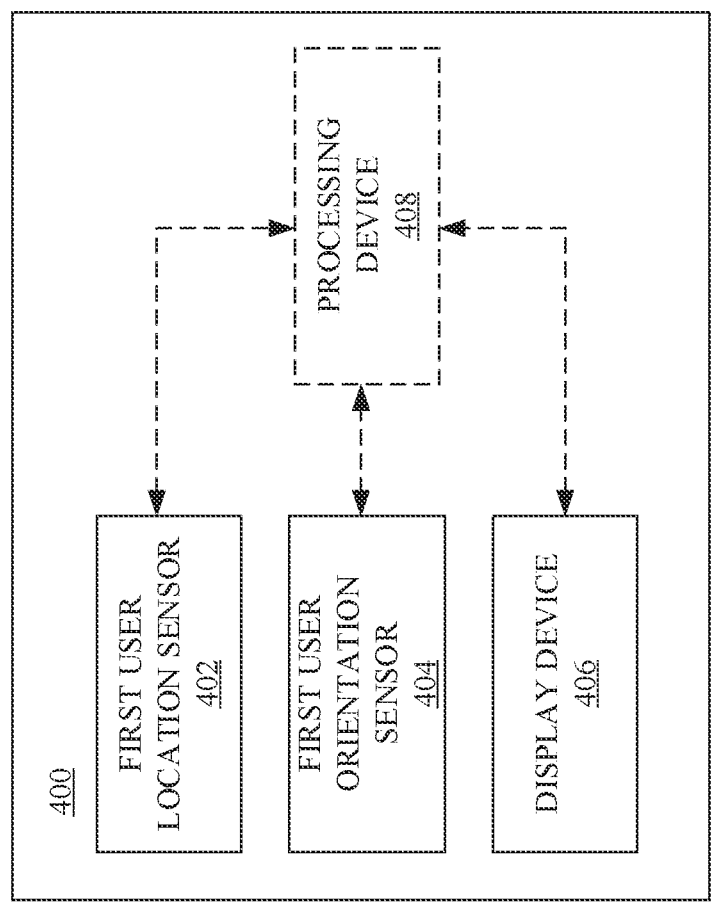
FIG. 4 is a block diagram of a first head mount display for facilitating provisioning of a virtual experience, in accordance with embodiments of the present disclosure.

FIG. 4 is a block diagram of a first head mount display 400 for facilitating provisioning of a virtual experience in accordance with some embodiments. The first head mount display 400 includes a first user location sensor 402 of the at least one first sensor configured for sensing the first user location and a first user orientation sensor 404 of the at least one first sensor configured for sensing the first user orientation.

Further, the first head mount display 400 may include a display device 406 to present visuals. The display device may a first see-through display device.

Further, the first head mount display 400 may include a processing device 408 configured to obtain sensor data from the first user location sensor 402 and the first user orientation sensor 404. Further, the processing device 408 may be configured to send visuals to the display device 406.

Figure 5:
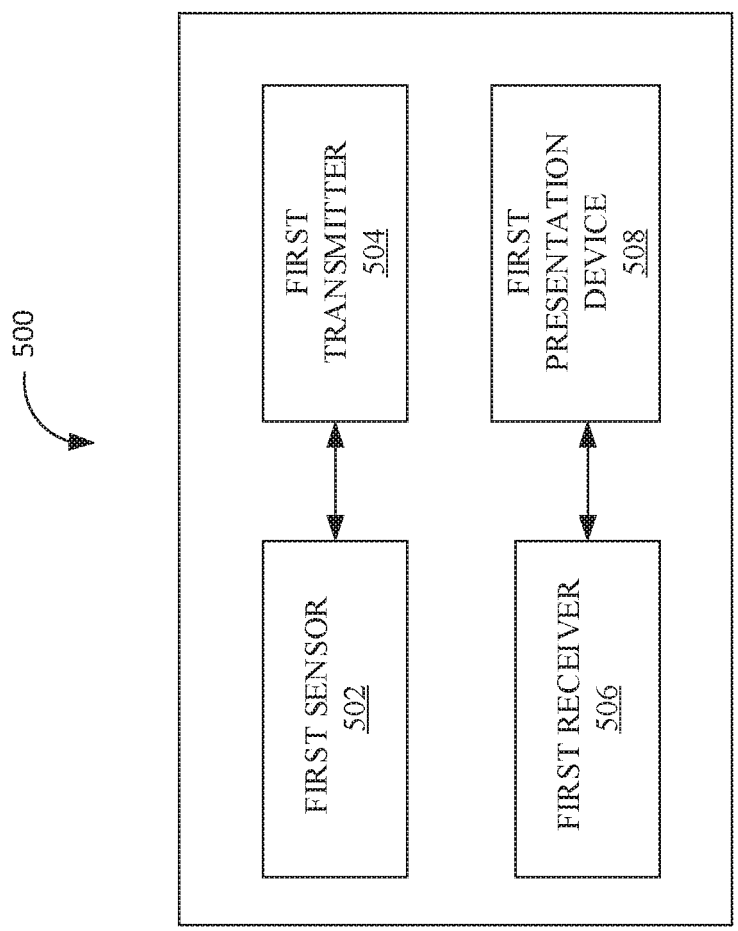
FIG. 5 is a block diagram of an apparatus for facilitating provisioning of a virtual experience, in accordance with embodiments of the present disclosure.

FIG. 5 is a block diagram of an apparatus 500 for facilitating provisioning of a virtual experience in accordance with some embodiments. The apparatus 500 may include at least one first sensor 502 (such as the at least one first sensor 310) configured for sensing at least one first sensor data associated with a first vehicle (such as the first vehicle 308). Further, the apparatus 500 may include a first transmitter 504 (such as the first transmitter 312) configured to be communicatively coupled to the at least first sensor 502. Further, the first transmitter 504 may be further configured for transmitting the at least one first sensor data to a communication device (such as the communication device 302) of a system over a first communication channel.

Further, the apparatus 500 may include a first receiver 506 (such as the first receiver 316) configured for receiving the at least one first presentation data from the communication device over the first communication channel.

Further, the apparatus 500 may include at least one first presentation device 508 (such as the at least one first presentation device 314) configured to be communicatively coupled to the first receiver 506. The at least one first presentation device 508 may be configured for presenting the at last one first presentation data.

Further, the communication device may be further configured for receiving at least one second sensor data corresponding to at least one second sensor (such as the at least one second sensor 320) associated with a second vehicle (such as the second vehicle 318). Further, the at least one second sensor may be communicatively coupled to a second transmitter (such as the second transmitter 322) configured for transmitting the at least one second sensor data over a second communication channel. Further, the system further may include a processing device (such as the processing device 304) communicatively coupled to the communication device. Further, the processing device may be configured for generating the at least one first presentation data based on the at least one second sensor data.

Figure 6:
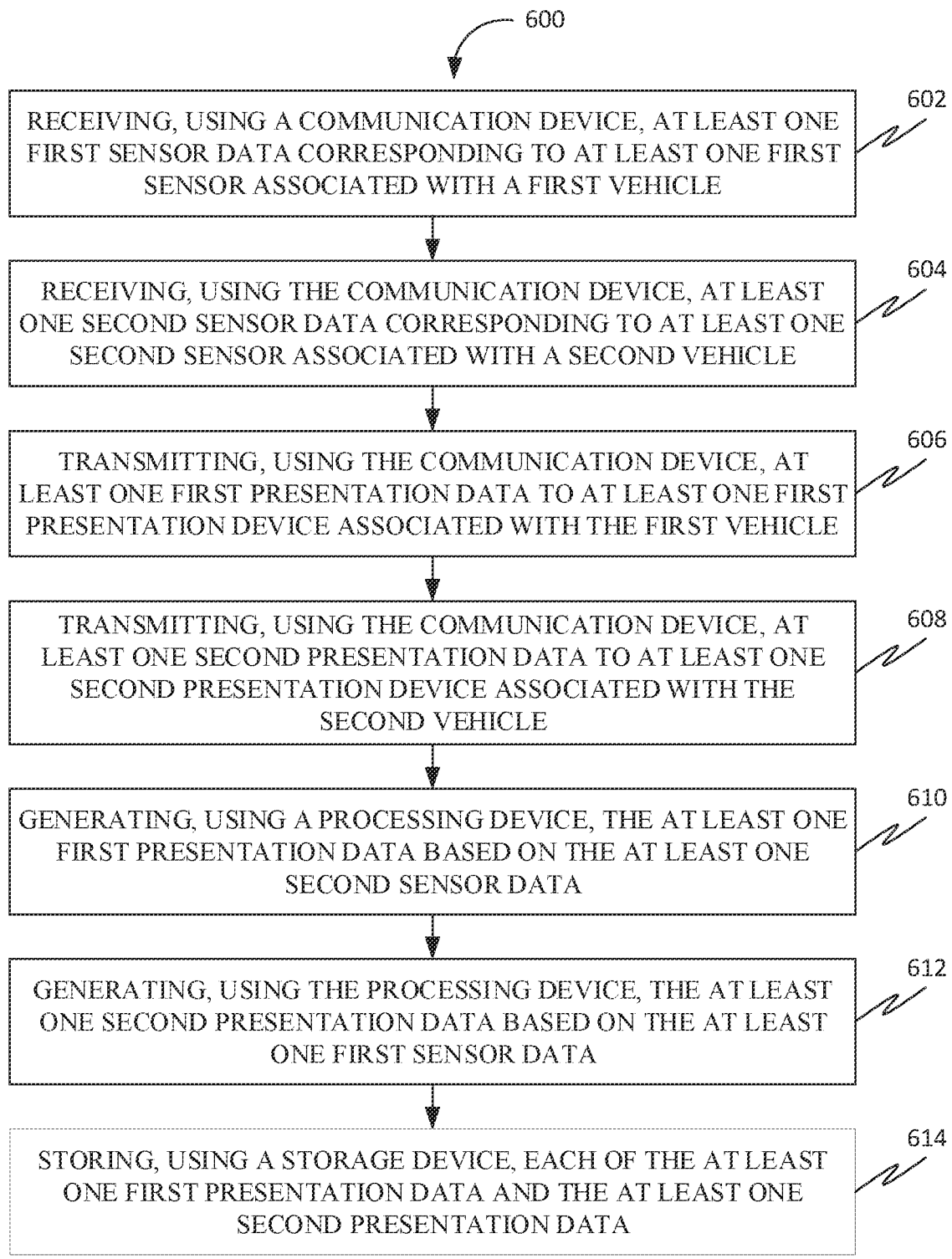
FIG. 6 is a flowchart of a method of facilitating provisioning of a virtual experience, in accordance with embodiments of the present disclosure.

FIG. 6 is a flowchart of a method 600 of facilitating provisioning of a virtual experience in accordance with some embodiments. At 602, the method 600 may include receiving, using a communication device (such as the communication device 302), at least one first sensor data corresponding to at least one first sensor (such as the at least one first sensor 310) associated with a first vehicle (such as the first vehicle 308). Further, the at least one first sensor may be communicatively coupled to a first transmitter (such as the first transmitter 312) configured for transmitting the at least one first sensor data over a first communication channel.

At 604, the method 600 may include receiving, using the communication device, at least one second sensor data corresponding to at least one second sensor (such as the at least one second sensor 320) associated with a second vehicle (such as the second vehicle 318). Further, the at least one second sensor may be communicatively coupled to a second transmitter (such as the second transmitter 322) configured for transmitting the at least one second sensor data over a second communication channel.

At 606, the method 600 may include transmitting, using the communication device, at least one first presentation data to at least one first presentation device associated with the first vehicle. Further, the at least one first presentation device may include a first receiver (such as the first receiver 316) configured for receiving the at least one first presentation data over the first communication channel. Further, the at least one first presentation device may be configured for presenting the at least one first presentation data.

At 608, the method 600 may include transmitting, using the communication device, at least one second presentation data to at least one second presentation device (such as the at least one second presentation device 324) associated with the second vehicle. Further, the at least one second presentation device may include a second receiver (such as the second receiver 326) configured for receiving the at least one second presentation data over the second communication channel. Further, the at least one second presentation device may be configured for presenting the at least one second presentation data.

At 610, the method 600 may include generating, using a processing device (such as the processing device 304), the at least one first presentation data based on the at least one second sensor data.

At 612, the method 600 may include generating, using the processing device, the at least one second presentation data based on the at least one first sensor data.

At 614, the method 600 may include storing, using a storage device (such as the storage device 306), each of the at least one first presentation data and the at least one second presentation data.

Figure 7:
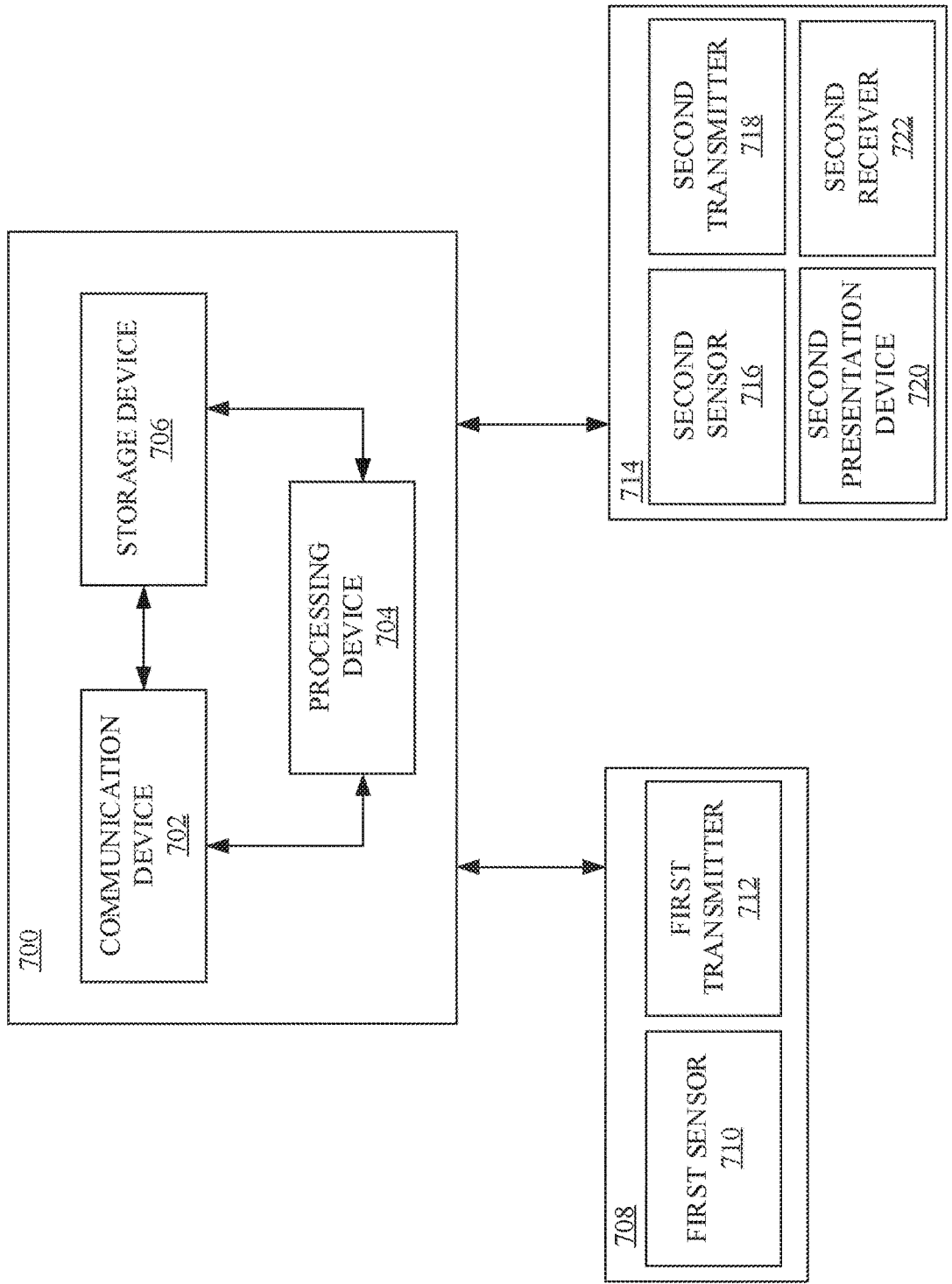
FIG. 7 shows a system for facilitating provisioning of a virtual experience, in accordance with embodiments of the present disclosure.

FIG. 7 shows a system 700 for facilitating provisioning of a virtual experience, in accordance with some embodiments. The system 700 may include a communication device 702 configured for receiving at least one first sensor data corresponding to at least one first sensor 710 associated with a first vehicle 708. Further, the at least one first sensor 710 may be communicatively coupled to a first transmitter 712 configured for transmitting the at least one first sensor data over a first communication channel.

Further, the communication device 702 may be configured for receiving at least one second sensor data corresponding to at least one second sensor 716 associated with a second vehicle 714. Further, the at least one second sensor 716 may include a second location sensor configured to detect a second location associated with the second vehicle 714. Further, the at least one second sensor 716 may be communicatively coupled to a second transmitter 718 configured for transmitting the at least one second sensor data over a second communication channel. Further, in some embodiments, the at least one second sensor 716 may include a second user sensor configured for sensing a second user variable associated with a second user of the second vehicle 714. Further, the second user variable may include a second user location and a second user orientation.

Figure 13:
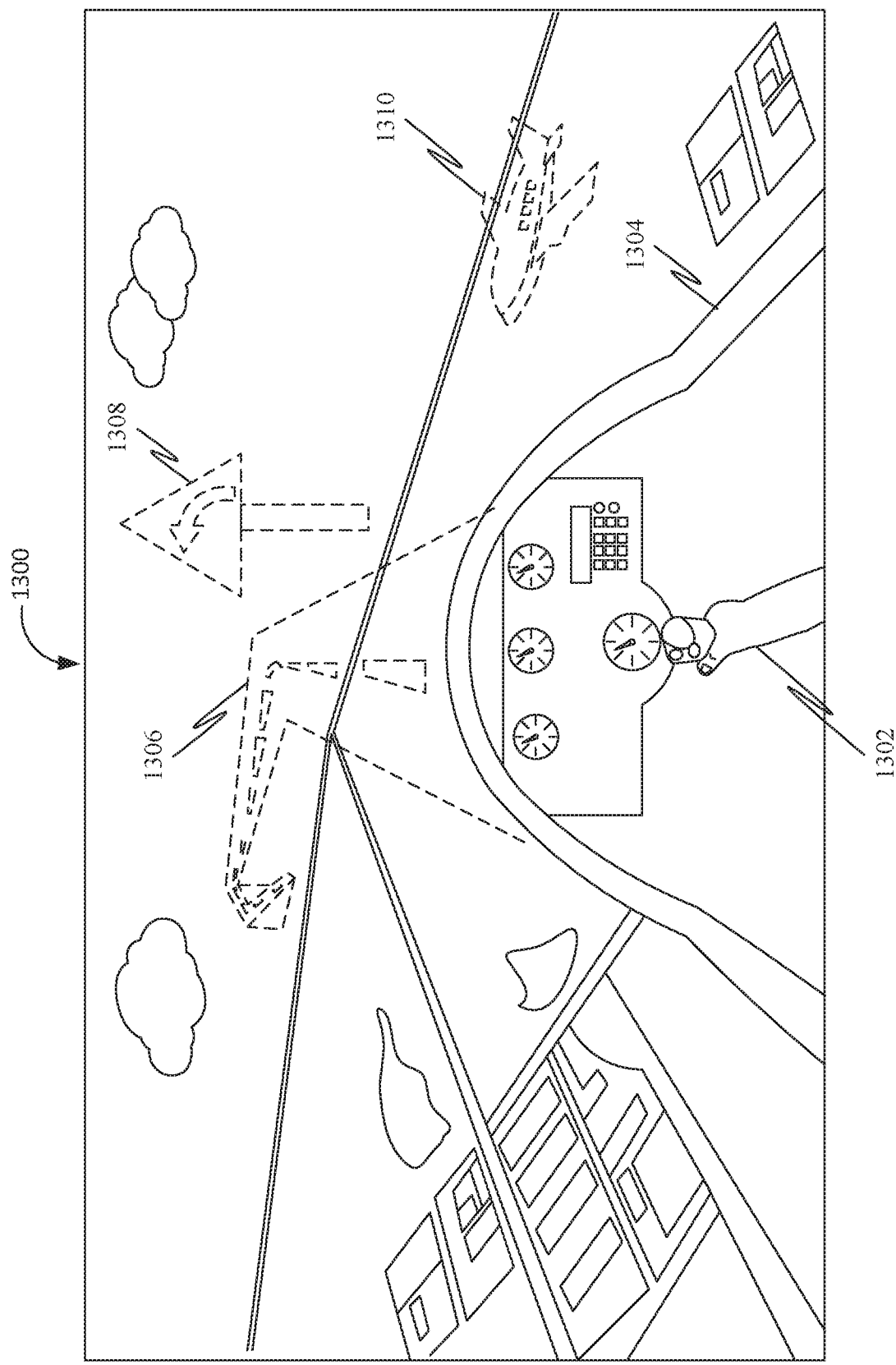
FIG. 13 shows an augmented reality view shown to a real pilot, in accordance with embodiments of the present disclosure.
Figure 15:
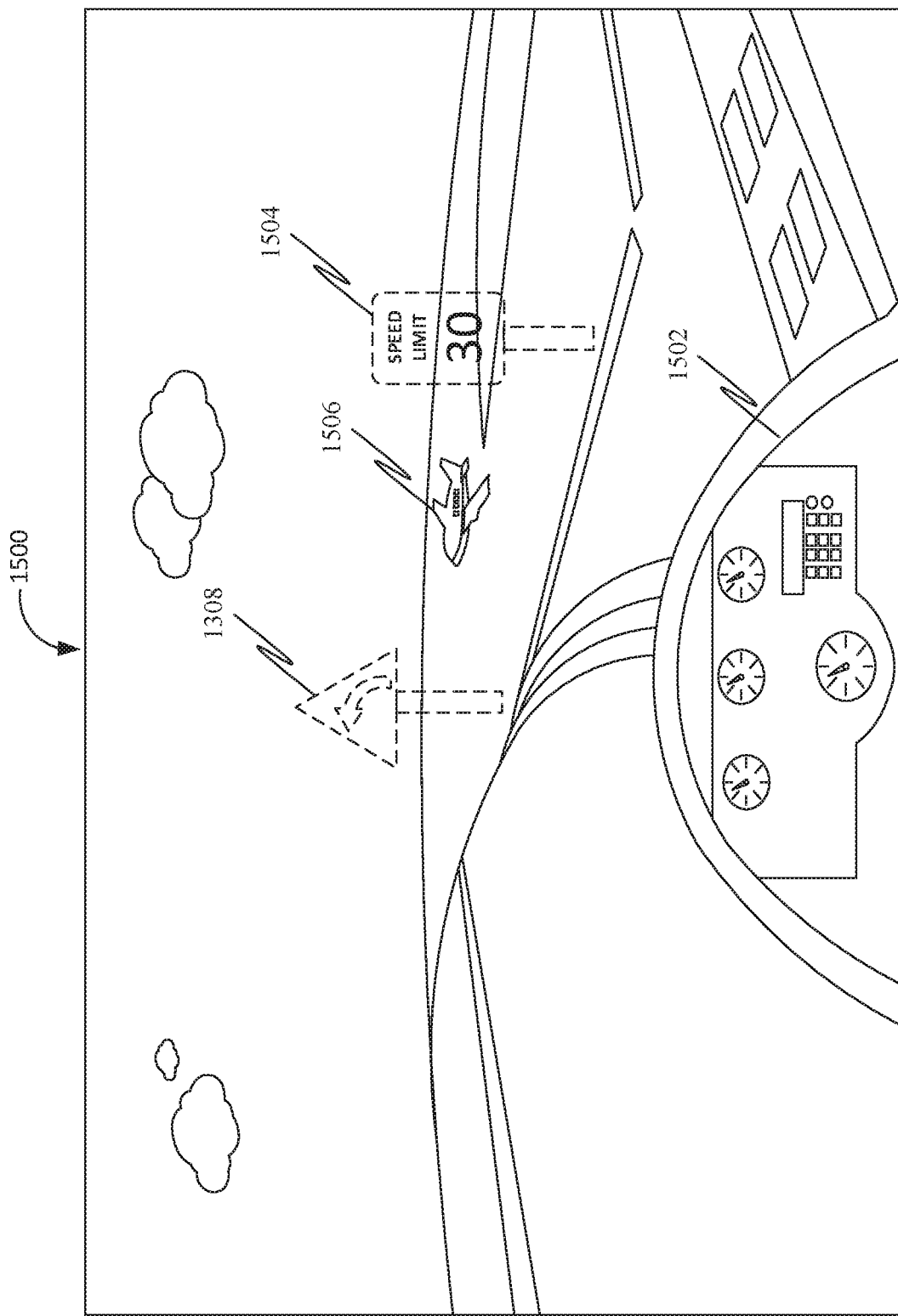
FIG. 15 shows an augmented reality view shown to a real pilot while aircraft is taxiing at an airport, in accordance with embodiments of the present disclosure.

Further, the communication device 702 configured for transmitting at least one second presentation data to at least one second presentation device 720 associated with the second vehicle 714. Further, the at least one second presentation data may include at least one second virtual object model corresponding to at least one second virtual object. Further, in some embodiments, the at least one second virtual object may include one or more of a navigational marker (such as a navigational marker 1308, and/or a signboard 1504 as shown in FIG. 15) and an air-corridor (such as a skyway 1306 as shown in FIG. 13). Further, the at least one second presentation device 720 may include a second receiver 722 configured for receiving the at least one second presentation data over the second communication channel. Further, the at least one second presentation device 720 may be configured for presenting the at least one second presentation data. Further, in some embodiments, the at least one second presentation device 720 may include a second head mount display. Further, the second head mount display may include a second user location sensor of the at least one second sensor 716 configured for sensing the second user location and a second user orientation sensor of the at least one second sensor 716 configured for sensing the second user orientation. Further, the second head mount display may include a second see-through display device.

Further, the system 700 may include a processing device 704 configured for generating the at least one second presentation data based on the at least one first sensor data and the at least one second sensor data. Further, the generating of the at least one second virtual object model may be independent of the at least one first sensor data. Further, in some embodiments, the processing device 704 may be configured for determining a second airspace class (with reference to FIG. 14) associated with the second vehicle 714 based on the second location including a second altitude associated with the second vehicle 714. Further, the generating of the at least one second virtual object model may be based on the second airspace class.

Further, the system 700 may include a storage device 706 configured for storing the at least one second presentation data. Further, in some embodiments, the storage device 706 may be configured for retrieving the at least one second virtual object model based on the second location associated with the second vehicle 714. Further, in some embodiments, the storage device 706 may be configured for storing a first three-dimensional model corresponding to the first vehicle 708. Further, the generating of the second presentation data may be based on the first three-dimensional model.

Further, in some embodiments, the communication device 702 may be configured for receiving an administrator command from an administrator device. Further, the generating of the at least one second virtual object model may be based on the administrator command.

Further, in some embodiments, the communication device 702 may be configured for transmitting at least one first presentation data to at least one first presentation device (not shown) associated with the first vehicle 708. Further, the at least one first presentation device may include a first receiver configured for receiving the at least one first presentation data over the first communication channel. Further, the at least one first presentation device may be configured for presenting the at least one first presentation data. Further, in some embodiments, the processing device 704 may be configured for generating the at least one first presentation data based on the at least one second sensor data. Further, in some embodiments, the storage device 706 may be configured for storing the at least one first presentation data. Further, in some embodiments, the storage device 706 may be configured for storing a second three-dimensional model corresponding to the second vehicle 714. Further, the generating of the first presentation data may be based on the second three-dimensional model.

Further, in some embodiments, the at least one first presentation data may include at least one first virtual object model corresponding to at least one first virtual object. Further, the generating of the at least one first virtual object model may be independent of the at least one second sensor data. Further, the storage device 706 may be configured for storing the at least one first virtual object model.

Further, in some exemplary embodiment, the communication device 702 may be configured for receiving at least one second sensor data corresponding to at least one second sensor 716 associated with a second vehicle 714. Further, the at least one second sensor 716 may be communicatively coupled to a second transmitter 718 configured for transmitting the at least one second sensor data over a second communication channel. Further, the communication device 702 may be configured for receiving at least one first sensor data corresponding to at least one first sensor 710 associated with a first vehicle 708. Further, the at least one first sensor 710 may include a first location sensor configured to detect a first location associated with the first vehicle 708. Further, the at least one first sensor 710 may be communicatively coupled to a first transmitter 712 configured for transmitting the at least one first sensor data over a first communication channel. Further, in some embodiments, the at least one first sensor 710 may include a first user sensor configured for sensing a first user variable associated with a first user of the first vehicle 708. Further, the first user variable may include a first user location and a first user orientation. Further, the communication device 702 configured for transmitting at least one first presentation data to at least one first presentation device (not shown) associated with the first vehicle 708. Further, the at least one first presentation data may include at least one first virtual object model corresponding to at least one first virtual object. Further, in some embodiments, the at least one first virtual object may include one or more of a navigational marker (such as a navigational marker 1308, and/or a signboard 1504 as shown in FIG. 15) and an air-corridor (such as a skyway 1306 as shown in FIG. 13). Further, the at least one first presentation device may include a first receiver configured for receiving the at least one first presentation data over the first communication channel. Further, the at least one first presentation device may be configured for presenting the at least one first presentation data. Further, in some embodiments, the at least one first presentation device may include a first head mount display. Further, the first head mount display may include a first user location sensor of the at least one first sensor 710 configured for sensing the first user location and a first user orientation sensor of the at least one first sensor 710 configured for sensing the first user orientation. Further, the first head mount display may include a first see-through display device. Further, the processing device 704 may be configured for generating the at least one first presentation data based on the at least one second sensor data and the at least one first sensor data. Further, the generating of the at least one first virtual object model may be independent of the at least one second sensor data. Further, in some embodiments, the processing device 704 may be configured for determining a first airspace class (with reference to FIG. 14) associated with the first vehicle 708 based on the first location including a first altitude associated with the first vehicle 708. Further, the generating of the at least one first virtual object model may be based on the first airspace class. Further, in some embodiments, the storage device 706 may be configured for storing the at least one first presentation data. Further, in some embodiments, the storage device 706 may be configured for retrieving the at least one first virtual object model based on the first location associated with the first vehicle 708. Further, in some embodiments, the storage device 706 may be configured for storing a second three-dimensional model corresponding to the second vehicle 714. Further, the generating of the first presentation data may be based on the second three-dimensional model. Further, in some embodiments, the communication device 702 may be configured for receiving an administrator command from an administrator device. Further, the generating of the at least one first virtual object model may be based on the administrator command. Further, in some embodiments, the communication device 702 may be configured for transmitting at least one second presentation data to at least one second presentation device (such as the second presentation device 720) associated with the second vehicle 714. Further, the at least one second presentation device may include a second receiver (such as the second receiver 722) configured for receiving the at least one second presentation data over the second communication channel. Further, the at least one second presentation device may be configured for presenting the at least one second presentation data. Further, in some embodiments, the processing device 704 may be configured for generating the at least one second presentation data based on the at least one first sensor data. Further, in some embodiments, the storage device 706 may be configured for storing the at least one second presentation data. Further, in some embodiments, the storage device 706 may be configured for storing a first three-dimensional model corresponding to the first vehicle 708. Further, the generating of the second presentation data may be based on the first three-dimensional model. Further, in some embodiments, the at least one second presentation data may include at least one second virtual object model corresponding to at least one second virtual object. Further, the generating of the at least one second virtual object model may be independent of the at least one first sensor data. Further, the storage device 706 may be configured for storing the at least one second virtual object model.

Figure 8:
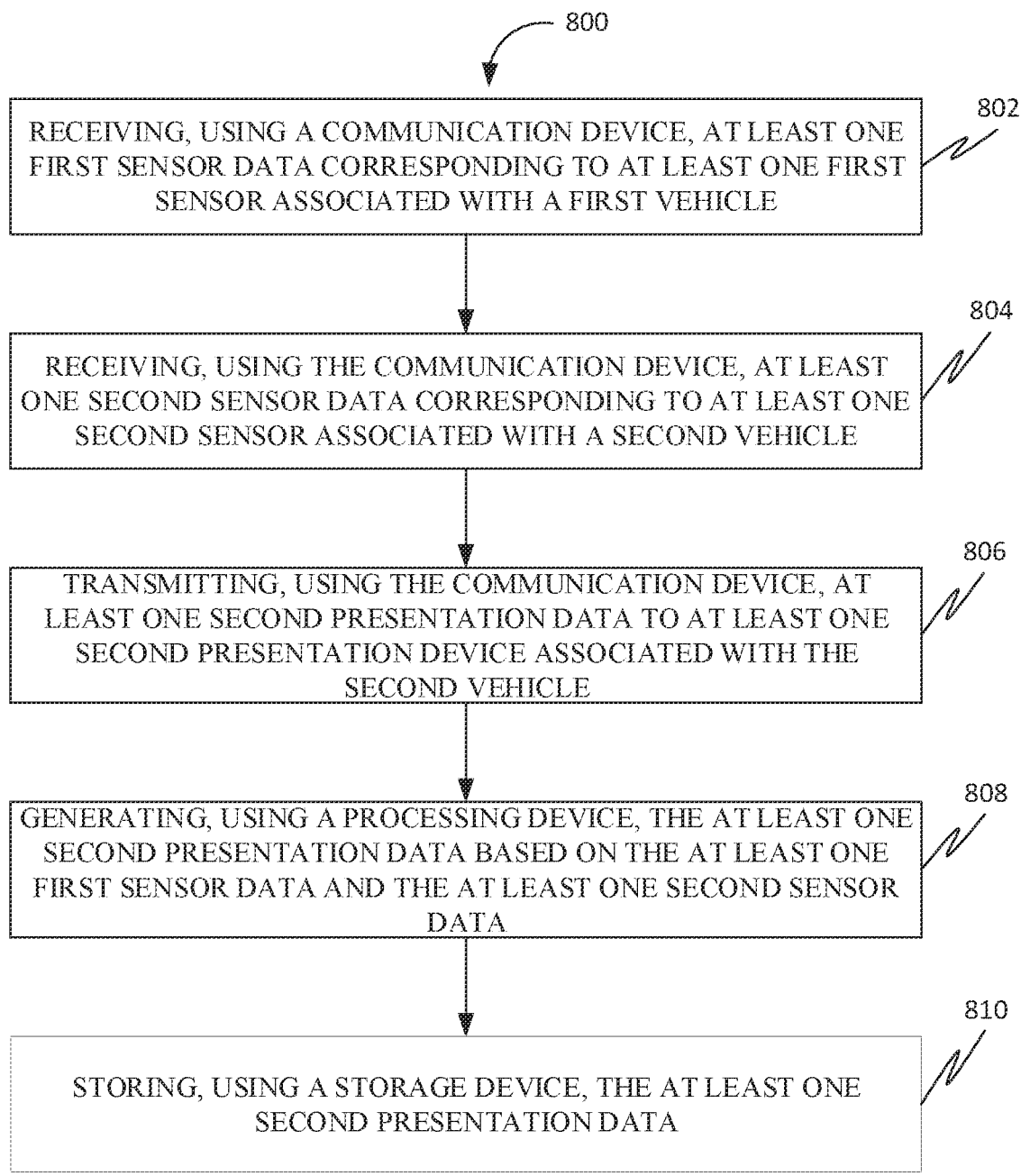
FIG. 8 is a flowchart of a method of facilitating provisioning of a virtual experience, in accordance with embodiments of the present disclosure.

FIG. 8 is a flowchart of a method 800 of facilitating provisioning of a virtual experience, in accordance with some embodiments. Accordingly, at 802, the method 800 may include receiving, using a communication device (such as the communication device 702), at least one first sensor data corresponding to at least one first sensor (such as the at least first sensor 710) associated with a first vehicle (such as the first vehicle 708). Further, the at least one first sensor may be communicatively coupled to a first transmitter (such as the first transmitter 712) configured for transmitting the at least one first sensor data over a first communication channel.

Further, at 804, the method 800 may include receiving, using the communication device, at least one second sensor data corresponding to at least one second sensor (such as the at least one second sensor 716) associated with a second vehicle (such as the second vehicle 714). Further, the at least one second sensor may include a second location sensor configured to detect a second location associated with the second vehicle. Further, the at least one second sensor may be communicatively coupled to a second transmitter (such as the second transmitter 718) configured for transmitting the at least one second sensor data over a second communication channel. Further, in some embodiments, the at least one second sensor may include a second user sensor configured for sensing a second user variable associated with a second user of the second vehicle. Further, the second user variable may include a second user location and a second user orientation.

Further, at 806, the method 800 may include transmitting, using the communication device, at least one second presentation data to at least one second presentation device (such as the at least one second presentation device 720) associated with the second vehicle. Further, the at least one second presentation data may include at least one second virtual object model corresponding to at least one second virtual object. Further, in some embodiments, the at least one second virtual object may include one or more of a navigational marker (such as a navigational marker 1308, and/or a signboard 1504 as shown in FIG. 15) and an air-corridor (such as a skyway 1306 as shown in FIG. 13). Further, the at least one second presentation device may include a second receiver (such as the second receiver 722) configured for receiving the at least one second presentation data over the second communication channel. Further, the at least one second presentation device may be configured for presenting the at least one second presentation data. Further, in some embodiments, the at least one second presentation device may include a second head mount display. Further, the second head mount display may include a second user location sensor of the at least one second sensor configured for sensing the second user location and a second user orientation sensor of the at least one second sensor configured for sensing the second user orientation. Further, the second head mount display may include a second see-through display device.

Further, at 808, the method 800 may include generating, using a processing device (such as the processing device 704), the at least one second presentation data based on the at least one first sensor data and the at least one second sensor data. Further, the generating of the at least one second virtual object model may be independent of the at least one first sensor data.

Further, at 810, the method 800 may include storing, using a storage device (such as the storage device 706), the at least one second presentation data.

Further, in some embodiments, the method 800 may include retrieving, using the storage device, the at least one second virtual object model based on the second location associated with the second vehicle.

Further, in some embodiments, the method 800 may include determining, using the processing device, a second airspace class (with reference to FIG. 14) associated with the second vehicle based on the second location including a second altitude associated with the second vehicle. Further, the generating of the at least one second virtual object model may be based on the second airspace class.

Further, in some embodiments, the method 800 may include storing, using the storage device, a first three-dimensional model corresponding to the first vehicle. Further, the generating of the second presentation data may be based on the first three-dimensional model.

Further, in some embodiments, the method 800 may include receiving, using the communication device, an administrator command from an administrator device. Further, the generating of the at least one second virtual object model may be based on the administrator command.

Further, in some exemplary embodiments, the method 800 may include receiving, using a communication device (such as the communication device 702), at least one second sensor data corresponding to at least one second sensor (such as the at least second sensor 716) associated with a second vehicle (such as the second vehicle 714). Further, the at least one second sensor may be communicatively coupled to a second transmitter (such as the second transmitter 718) configured for transmitting the at least one second sensor data over a second communication channel. Further, the method 800 may include receiving, using the communication device, at least one first sensor data corresponding to at least one first sensor (such as the at least one first sensor 710) associated with a first vehicle (such as the first vehicle 708). Further, the at least one first sensor may include a first location sensor configured to detect a first location associated with the first vehicle. Further, the at least one first sensor may be communicatively coupled to a first transmitter (such as the first transmitter 712) configured for transmitting the at least one first sensor data over a first communication channel. Further, in some embodiments, the at least one first sensor may include a first user sensor configured for sensing a first user variable associated with a first user of the first vehicle. Further, the first user variable may include a first user location and a first user orientation. Further, the method 800 may include transmitting, using the communication device, at least one first presentation data to at least one first presentation device associated with the first vehicle 708. Further, the at least one first presentation data may include at least one first virtual object model corresponding to at least one first virtual object. Further, in some embodiments, the at least one first virtual object may include one or more of a navigational marker (such as a navigational marker 1308, and/or a signboard 1504 as shown in FIG. 15) and an air-corridor (such as a skyway 1306 as shown in FIG. 13). Further, the at least one first presentation device may include a first receiver configured for receiving the at least one first presentation data over the first communication channel. Further, the at least one first presentation device may be configured for presenting the at least one first presentation data. Further, in some embodiments, the at least one first presentation device may include a first head mount display. Further, the first head mount display may include a first user location sensor of the at least one first sensor configured for sensing the first user location and a first user orientation sensor of the at least one first sensor configured for sensing the first user orientation. Further, the first head mount display may include a first see-through display device. Further, the method 800 may include generating, using a processing device (such as the processing device 704), the at least one first presentation data based on the at least one second sensor data and the at least one first sensor data. Further, the generating of the at least one first virtual object model may be independent of the at least one second sensor data. Further, the method 800 may include storing, using a storage device (such as the storage device 706), the at least one first presentation data. Further, in some embodiments, the method 800 may include retrieving, using the storage device, the at least one first virtual object model based on the first location associated with the first vehicle 708. Further, in some embodiments, the method 800 may include determining, using the processing device, a first airspace class (with reference to FIG. 14) associated with the first vehicle 708 based on the first location including a first altitude associated with the first vehicle. Further, the generating of the at least one first virtual object model may be based on the first airspace class. Further, in some embodiments, the method 800 may include storing, using the storage device, a second three-dimensional model corresponding to the second vehicle 714. Further, the generating of the first presentation data may be based on the second three-dimensional model. Further, in some embodiments, the method 800 may include receiving, using the communication device, an administrator command from an administrator device. Further, the generating of the at least one first virtual object model may be based on the administrator command.

Figure 9:
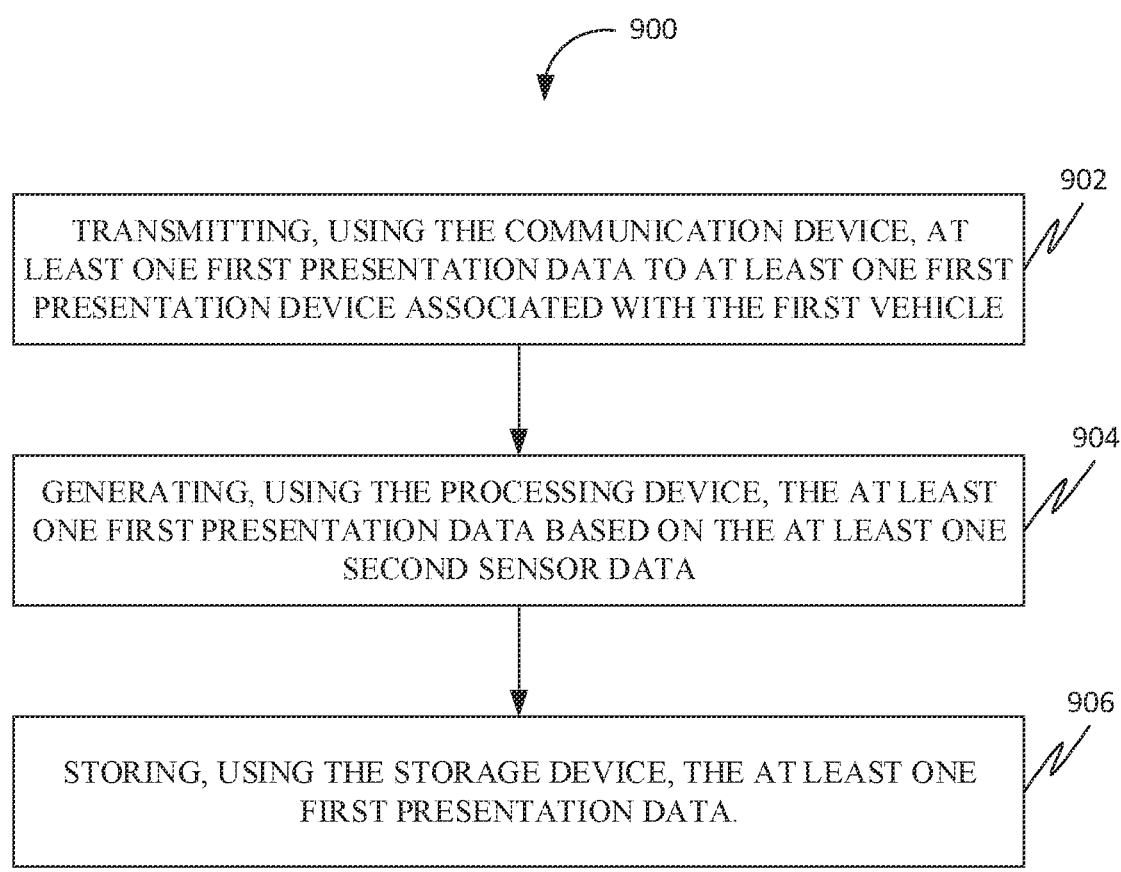
FIG. 9 is a flowchart of a method to facilitate providing a first presentation data, in accordance with embodiments of the present disclosure.

FIG. 9 is a flowchart of a method 900 to facilitate providing at least one first presentation data. Accordingly, at 902, the method 900 may include transmitting, using the communication device, at least one first presentation data to at least one first presentation device associated with the first vehicle. Further, the at least one first presentation device may include a first receiver configured for receiving the at least one first presentation data over the first communication channel. Further, the at least one first presentation device may be configured for presenting the at least one first presentation data.

Further, at 904, the method 900 may include generating, using the processing device, the at least one first presentation data based on the at least one second sensor data.

Further, at 906, the method 900 may include storing, using the storage device, the at least one first presentation data.

Further, in some embodiments, the method 900 may include storing, using the storage device, a second three-dimensional model corresponding to the second vehicle. Further, the generating of the first presentation data may be based on the second three-dimensional model.

Further, in some embodiments, the at least one first presentation data may include at least one first virtual object model corresponding to at least one first virtual object.

Further, the generating of the at least one first virtual object model may be independent of the at least one second sensor data. Further, the method 900 may include storing, using the storage device, the at least one first virtual object model.

Further, in some exemplary embodiment, the method 900 may facilitate providing at least one second presentation data. Accordingly, the method 900 may include transmitting, using the communication device, at least one second presentation data to at least one second presentation device associated with the second vehicle. Further, the at least one second presentation device may include a second receiver configured for receiving the at least one second presentation data over the second communication channel. Further, the at least one second presentation device may be configured for presenting the at least one second presentation data. Further, the method 900 may include generating, using the processing device, the at least one second presentation data based on the at least one first sensor data. Further, the method 900 may include storing, using the storage device, the at least one second presentation data. Further, in some embodiments, the method 900 may include storing, using the storage device, a first three-dimensional model corresponding to the first vehicle. Further, the generating of the second presentation data may be based on the first three-dimensional model. Further, in some embodiments, the at least one second presentation data may include at least one second virtual object model corresponding to at least one second virtual object. Further, the generating of the at least one second virtual object model may be independent of the at least one first sensor data. Further, the method 900 may include storing, using the storage device, the at least one second virtual object model.

Figure 10:
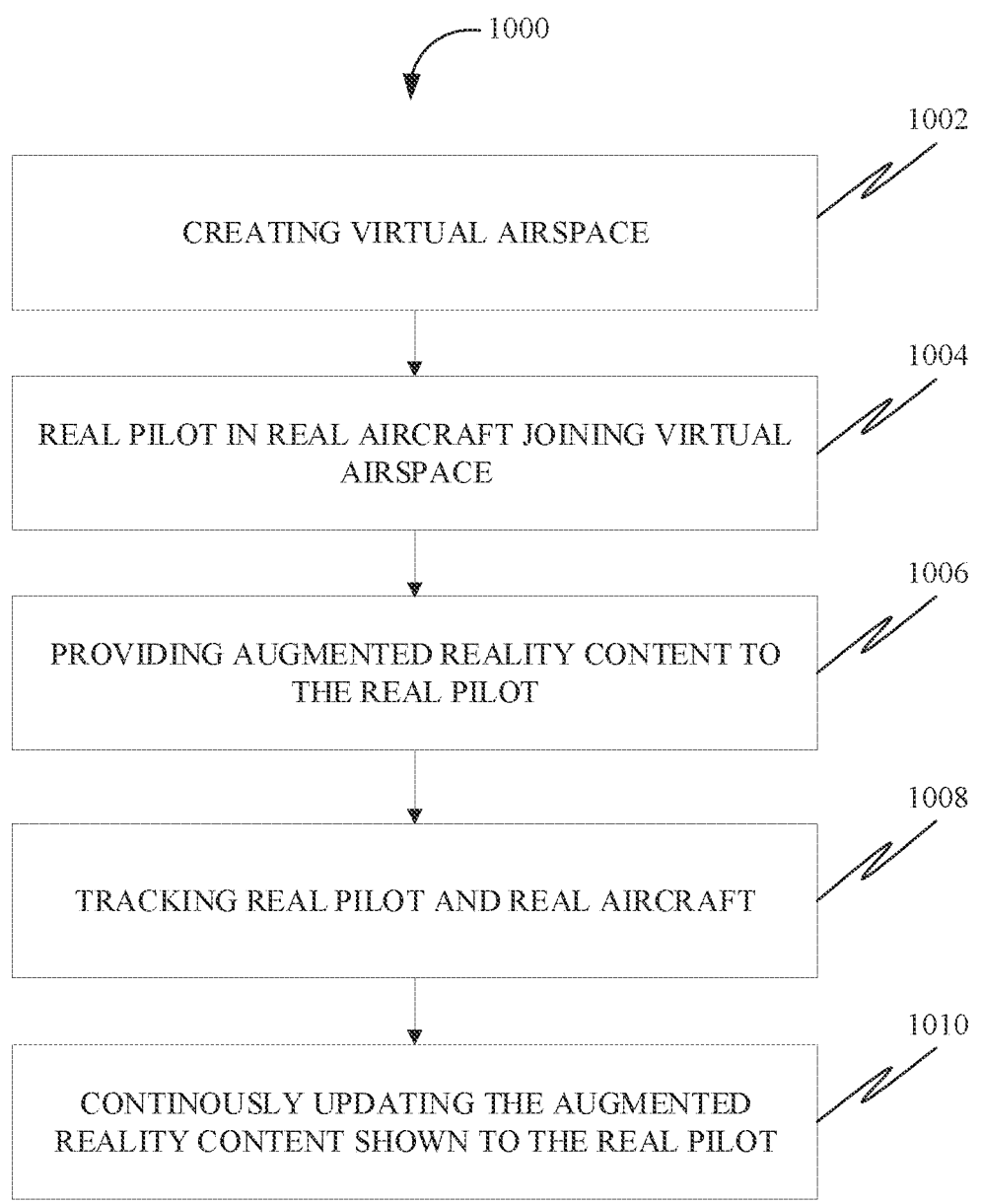
FIG. 10 illustrates a method to allow real pilots in real aircraft using augmented and virtual reality to meet in a virtual piece of airspace, in accordance with embodiments of the present disclosure.

FIG. 10 shows a method 1000 to allow real pilots in real aircraft using augmented and virtual reality to meet in a virtual airspace, in accordance with some embodiments. Accordingly, at 1002, the method 1000 may include creating the virtual airspace in an augmented and virtual reality environment. The virtual airspace may be a three-dimensional space in which one or more aircraft may meet.

Further, at 1004, the method 1000 may include a real pilot in a real aircraft joining the virtual airspace via their augmented and virtual reality equipment. The real aircraft may be flying in the real world. Accordingly, an image of the real aircraft may be included in the virtual airspace. Therefore, this provides a live simulation involving real people operating real systems.

In some embodiments, the virtual airspace may include virtual aircraft, which may be flown by real people in simulated systems, on the ground.

In some embodiments, the virtual airspace may further include constructed aircraft (and/or targets). The constructed aircraft may be generated and controlled using computer graphics and processing systems.

Further, at 1006, the method 1000 may include providing augmented and virtual reality content to the real pilot via their augmented and virtual reality equipment. In some embodiments, the method may include providing augmented and virtual reality content to the real people (on the ground) flying virtual aircraft in the virtual airspace.

Further, at 1008, the method 1000 may include tracking the real pilot and the real aircraft. This may include tracking the position and orientation of the pilot's head within the cockpit of the aircraft using the one or more internal sensors. Further, this may include tracking the operational state (e.g. location, speed, direction of travel, etc.) of the aircraft in the virtual airspace using the one or more external sensors.

Moreover, at 1010, the method 1000 may include continuously updating the augmented and virtual reality content shown to the real pilot flying the real aircraft based on the tracking of the real pilot and the real aircraft.

In some embodiments, the augmented and virtual reality content shown to the real pilot flying the real aircraft may be updated based on the operational state (e.g. location, speed, direction of travel, etc.) of the virtual aircraft flown by the real people (on the ground) and the operational state (e.g. location, speed, direction of travel, etc.) of the constructed aircraft.

In some embodiments, the method 1000 may include continuously updating the augmented and virtual reality content shown to the real pilot (on the ground) flying the virtual aircraft based on the tracking the real pilot and the real aircraft, the operational state (e.g. location, speed, direction of travel, etc.) of the virtual aircraft flown by the real people (on the ground) and the operational state (e.g. location, speed, direction of travel, etc.) of the constructed aircraft.

Figure 11:
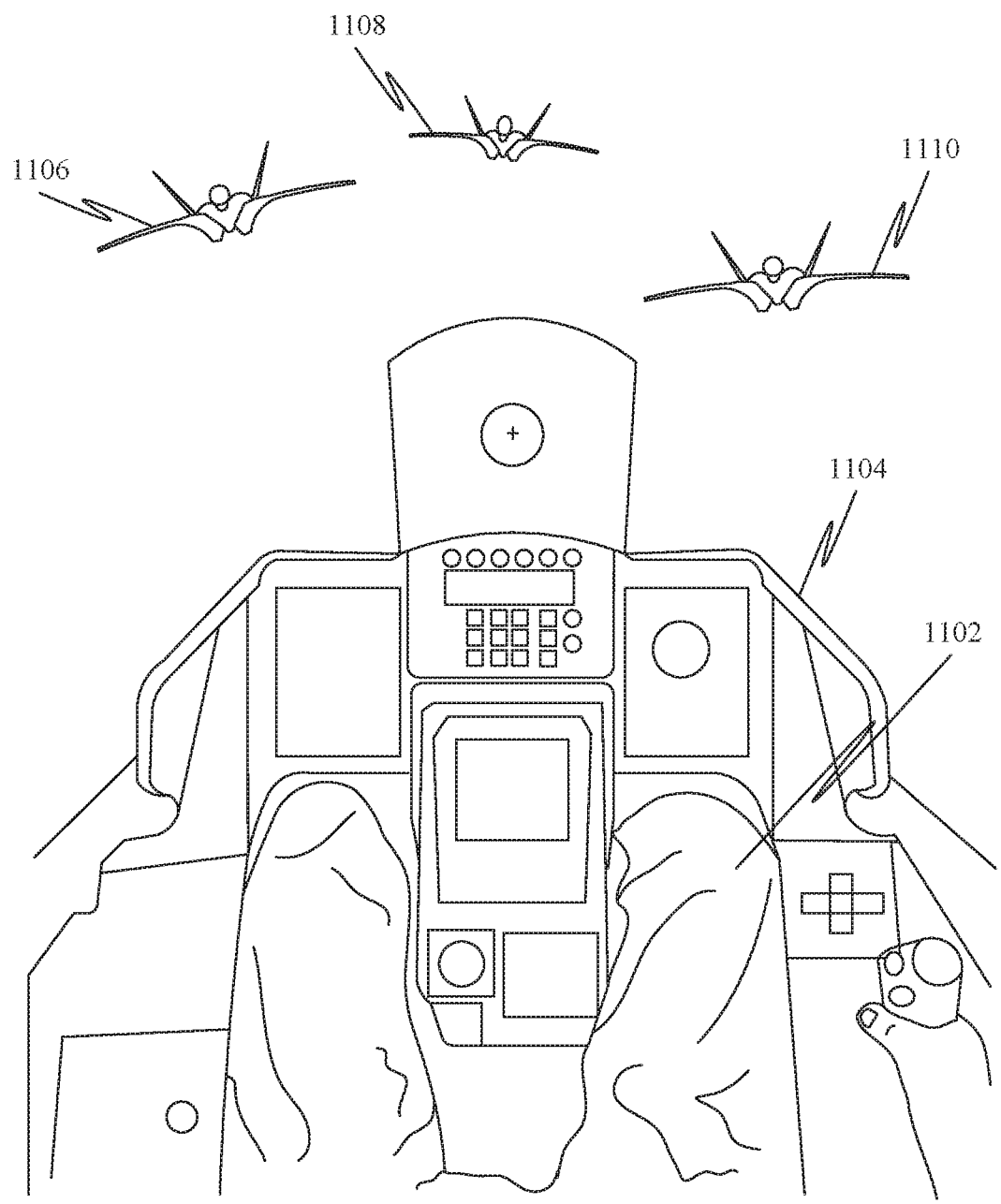
FIG. 11 shows an augmented reality view shown to a real pilot, in accordance with embodiments of the present disclosure.

FIG. 11 shows the augmented and virtual reality content shown to a real pilot (such as pilot 1102) flying a real aircraft (such as aircraft 1104), in accordance with an exemplary embodiment. The augmented and virtual reality content may include one or more live aircraft 1106 (representing real pilots flying real aircraft), one or more virtual aircraft 1108 (representing real people on the ground, flying virtual aircraft) and one or more constructed aircraft 1110 (representing aircraft generated and controlled using computer graphics and processing systems). Accordingly, the pilot 1102 wearing an augmented and virtual reality display device may look out the cockpit window to see enemy aircraft (such as live aircraft 1106, virtual aircraft 1108, and/or constructed aircraft 1110) in extremely high fidelity. Further, the pilot 1102 may then practice offensive/defensive air-to-air maneuvers against the digital enemy while continuing to fly his own aircraft 1104.

Systems and methods according to the principles of the present inventions relate to an augmented reality system adapted to provide a virtual common training environment to operators of vehicles that are separated by a distance where they cannot see one another; however, the common training environment provides the separated operators to see computer generated representations of one another so they can maneuver as if they were within visual range of one another. This may be useful when teaching separated operators to maneuver in a coordinated fashion (e.g. within a close formation of planes) when the operators cannot otherwise see each other. In embodiments, two separate head-mounted see-through optics, a first and a second, adapted to present digital content viewable by a user and having a transparency that allows the user to see though to the surrounding environment are provided to the visually separated operators. A training simulation system may be adapted to present digital content to each of the first and second optics, wherein the digital content represents a vehicle operated by the other user. With this arrangement, each operator can 'see' the other vehicle as digital content in the see-through display such that they can coordinate maneuvers. The digital representation of the other's vehicle may be geospatially positioned based on the other vehicle's actual geospatial position as represented in the common training environment. For example, the position of the digital representation of the other vehicle may be represent the other vehicle's actual geospatial location and condition in its real airspace such that movements of the second vehicle are duplicated by the representation of the second vehicle, but the geospatial location of the representation in the virtual common training environment may be based on the training exercise such that the apparent distance from an operator to the representation is related and relative.

Systems and methods according to the principles of the present inventions relate to presenting of a coordinated training scenario to two or more vehicles in separate airspaces where the two or more vehicles are not within visual range of one another. In embodiments, a common virtual airspace is provided to the two or more vehicles, wherein the common virtual airspace includes a computer generated training asset that is viewable by an operator of each vehicle as content overlaying a real airspace surrounding each of the respective vehicles. It is presented as augmented reality content. A system may identify a geospatial location for each of the two or more vehicles within the virtual airspace, which may be based on the vehicle's actual geospatial locations within their respective airspace and represented within the common virtual airspace. The system may position the computer generated training asset at a geospatial location within the virtual airspace within a visual range of the two or more vehicles such that the perspective of the computer generated training asset is separately based on the geospatial location for each of the two or more vehicles.

In embodiments, systems and methods may involve presenting a first pilot of a first vehicle, of the two or more vehicles, with computer generated content representing a second vehicle, of the two of more vehicles, within a common virtual environment when the first pilot looks in the direction of the second vehicle's geospatial location as mapped into the common virtual environment. This facilitates visual coordination between the otherwise visually separated vehicles. For example, a real pilot in a real aircraft flying over Nevada may be able to 'see' a second plane that is actually flying over Virginia as an augmented reality representation in close proximity to the real aircraft. The relative positioning of the representation of the second aircraft to the real aircraft may be programmed based on the training scenario. The scenario, for example, may begin by geospatially locating the two visually separated aircraft within 50 feet of one another in a common virtual airspace. Each pilot would be able to look and see the other's aircraft represented as augmented reality content at 50 feet away. Then the simulation may track the actual geospatial positions and conditions of both aircraft to move the representations presented to the pilots based on actual movements. If the either plane makes a real maneuver that affects the relative position of the two aircraft in the virtual environment, the result will be shown by changing the position of the representation of the other aircraft. If the second aircraft puts on its afterburners and the first does not, the pilot of the first aircraft will see the second aircraft pull away in the virtual airspace as the second aircraft flies faster in its real airspace.

In embodiments, the presenting of the computer generated content representing the second vehicle is further based on an unobstructed line of sight between the first pilot and the location computer content representing the second vehicle in the virtual environment. The apparent relative position between the first vehicle and the computer generated content representing the second vehicle may be based on the actual movements of the first vehicle and a second vehicle. The computer generated training asset and the computer generated content representing the second vehicle may move separately within the virtual environment, the second vehicle representation movements may be based on the actual movement of the second vehicle and the training asset movements may be based on a computer generated path (e.g. predetermined path) intended to interact with at least one of the two or more vehicles.

In embodiments, the geospatial boundaries of the virtual airspace are set such that each of the two or more vehicles operate within respectively clear airspace. In embodiments, the common virtual airspace represents one of the two or more vehicle's actual airspace. In embodiments, the common virtual airspace represents an airspace in an enemy environment.

Systems and methods according to the principles of the present inventions relate to providing a common virtual environment provided to both air and ground assets. A combat training augmented reality simulation system may be provided to real aircraft and real ground vehicle. The simulation may involve including virtual air and ground assets. In embodiments, at least two separate head-mounted see-through optics, a first and a second, are provided and adapted to present digital content viewable by a user and having a transparency that allows the user to see though to the surrounding environment. An aircraft mounted tracking systems mounted in the real aircraft may be used to track the geospatial position and condition of the aircraft and the direction in which a pilot is apparently looking. A ground vehicle tracking system may also be mounted in the real ground vehicle so the ground tracking system tracks the geospatial position of the real ground vehicle and the direction in which a driver is apparently looking. A training simulation system adapted to generate 3D virtual content for presentation on the respective separate optics, wherein the virtual content provides the pilot and the driver with a different perspective view of the same 3D virtual object.

Figure 12:
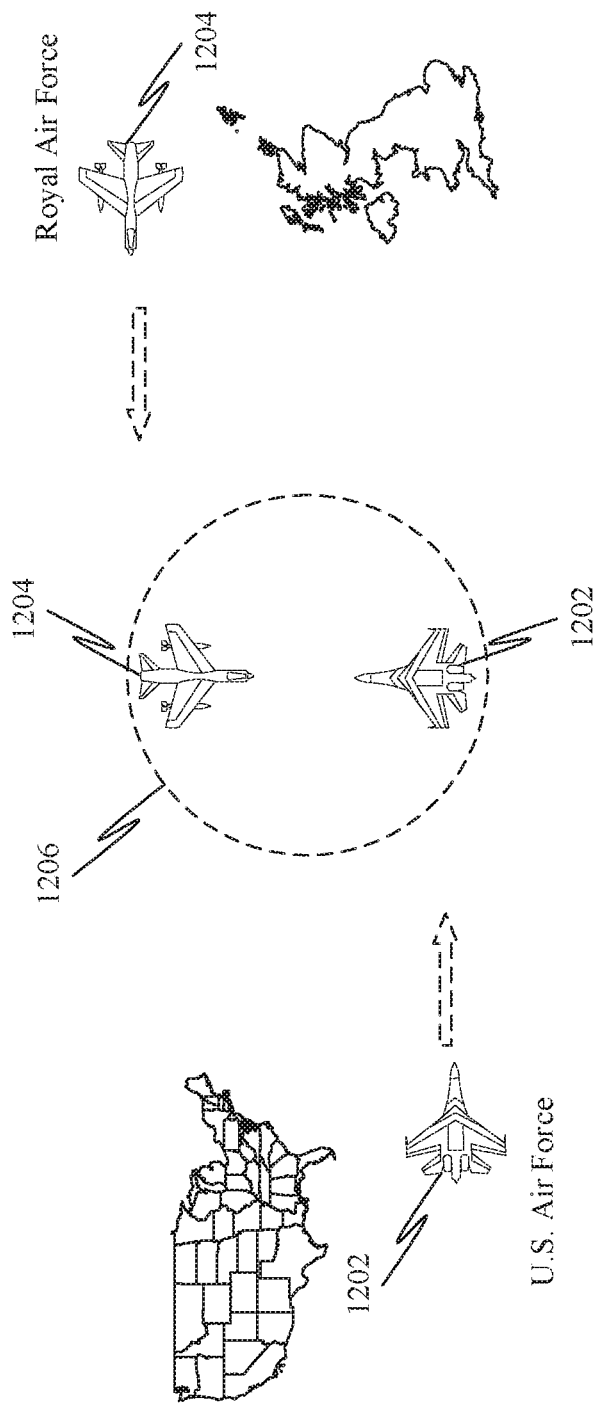
FIG. 12 shows two real aircraft in a virtual airspace, in accordance with embodiments of the present disclosure.

FIG. 12 shows two real aircraft (such as aircraft 1202, and aircraft 1204) in a virtual airspace 1206, in accordance with an exemplary embodiment. The two real aircraft (such as aircraft 1202, and aircraft 1204) may be flown by two real pilots (a pilot A and a pilot B). Further, both the pilots may be capable of using the disclosed system (ATARI) to view the augmented and virtual reality content. Further, the pilot A may be able to see the pilot B via their augmented and virtual reality equipment. Further, the pilot A may be able to see one or more virtual aircraft (not shown in FIG. 12) which may be enemy aircraft or friendly aircraft.

In some embodiments, the pilot A and the pilot B may be enemies and may engage in combat against each other.

In some embodiments, the pilot A and the pilot B may be friendly and may cooperate in combat against enemy aircraft. High-speed communication between the two aircraft may be employed to allow for effective cooperation.

In some embodiments, the two aircraft 1202-1204 may not fly together in the real world. As shown in FIG. 12, one aircraft (such as aircraft 1202) may take off in the USA and the other aircraft (such as aircraft 1204) may take off in the UK. Therefore, the two aircraft 1202-1204 fly physically in the air in different geographical location, but they may share the same virtual airspace (6D airspace) provided by the disclosed system (ATARI).

Accordingly, the pilot A may fight against the pilot B in the common virtual airspace 1206. Therefore, each pilot may see other pilot's virtual image in their augmented and virtual reality equipment.

Further, the pilot A and the pilot B may fight together against enemies. Again, both pilots may see each other's virtual images. However, in this case, they may collaborate, and not fight against each other.

FIG. 13 shows an augmented reality view 1300 shown to a real pilot (such as pilot 1302), in accordance with an exemplary embodiment. Further, the augmented reality view 1300 may be generated and displayed over a virtual reality display. For example, the virtual reality display may include a head-mounted display (HMD), eyeglasses, Head-Up Display (HUD), smart contact lenses, a virtual retinal display, an eye tap, a Primary Flight Display (PFD) and a cockpit glass etc. Further, the augmented reality view 1300 may assist a pilot 1302 in flying a civilian aircraft 1304.

As shown in FIG. 13, the augmented reality view 1300 includes a road drawn in the sky (such as a skyway 1306) indicating a path that the civilian aircraft 1304 may take in order to land at an airport. Further, the augmented reality view 1300 may include a navigation marker 1308 indicating to the pilot 1302 that the civilian aircraft 1304 should take a left turn. The navigation marker 1308 may assist the pilot 1302 in navigating towards a landing strip to land the civilian aircraft 1304.

Therefore, the augmented reality view 1300 may provide pilots with a similar view as seen by public transport drivers (e.g. taxi or bus) on the ground. The pilots (such as the pilot 1302) may see roads (such as the skyway 1306) that the pilot 1302 need to drive on. Further, the pilot 1302, in an instance, may see signs just like a taxi driver who may just look out of a window and see road signs.

Further, the augmented reality view 1300 may include (but not limited to) one or more of skyways (such the skyway 1306), navigation markers (such as the navigation marker 1308), virtual tunnels, weather information, an air corridor, speed, signboards for precautions, airspace class, one or more parameters shown on a conventional horizontal situation indicator (HSI) etc. The skyways may indicate a path that an aircraft (such as the civilian aircraft 1304) should take. The skyways may appear similar to roads on the ground. The navigation markers may be similar to regulatory road signs used on the roads on the ground. Further, the navigation markers may instruct pilots (such as the pilot 1302) on what they must or should do (or not do) under a given set of circumstances. Further, the navigation markers may be used to reinforce air-traffic laws, regulations or requirements which apply either at all times or at specified times or places upon a flight path. For example, the navigation markers may include one or more of a left curve ahead sign, a right curve ahead sign, a keep left sign, and a keep to right sign. Further, the virtual tunnels may appear similar to tunnels on roads on the ground. The pilot 1302 may be required to fly the aircraft through the virtual tunnel. Further, the weather information may include real-time weather data that affects flying conditions. For example, the weather information may include information related to one or more of wind speed, gust, and direction; variable wind direction; visibility, and variable visibility; temperature; precipitation; and cloud cover. Further, the air corridor may indicate an air route along which the aircraft is allowed to fly, especially when the aircraft is over a foreign country. Further, the augmented reality view 1300 may include speed information. The speed information may include one or more of a current speed, a ground speed, and a recommended speed. The signboards for precautions may be related to warnings shown to the pilot 1302. The one or more parameters shown on a conventional horizontal situation indicator (HSI) include NAV warning flag, lubber line, compass warning flag, course select pointer, TO/FROM indicator, glideslope deviation scale, heading select knob, compass card, course deviation scale, course select knob, course deviation bar (CDI), symbolic aircraft, dual glideslope pointers, and heading select bug.

Further, in some embodiments, information such as altitude, attitude, airspeed, the rate of climb, heading, autopilot and auto-throttle engagement status, flight director modes and approach status etc. that may be displayed on a conventional primary flight display may also be displayed in the augmented reality view 1300.

Further, in some embodiments, the augmented reality view 1300 may include a one or more of other vehicles (such as another airplane 1310). Further, the one or more other vehicles, in an instance, may include one or more live vehicles (such as representing real pilots flying real aircraft), one or more virtual vehicles (such as representing real people on the ground, flying virtual aircraft), and one or more constructed vehicles (such as representing aircraft generated and controlled using computer graphics and processing systems).

Figure 14:
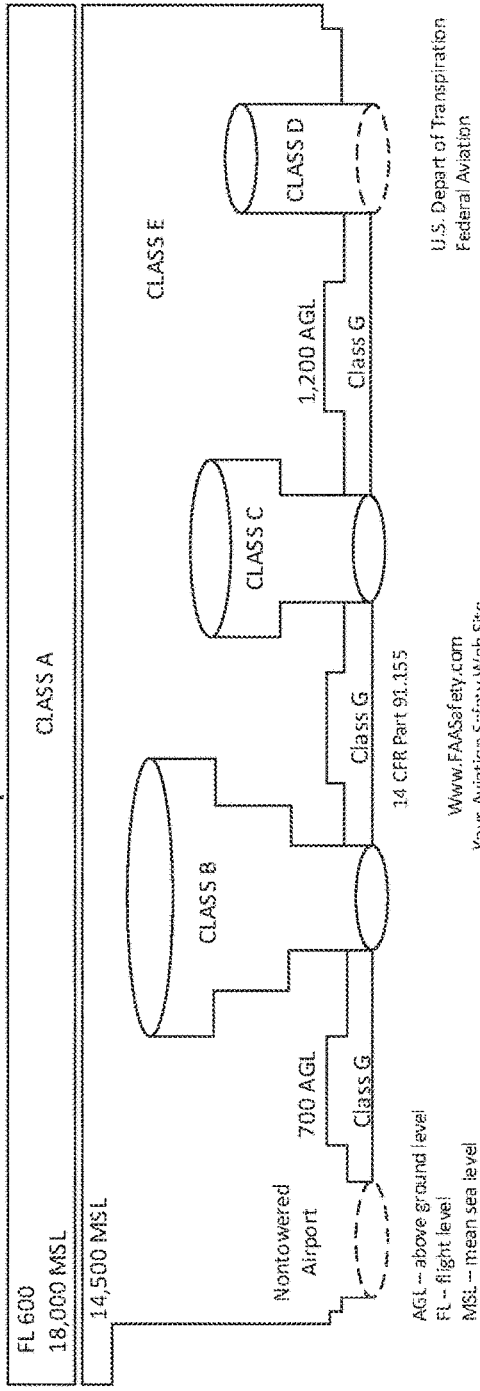
FIG. 14 is a chart related to the United States airspace system's classification scheme.

Further, the augmented reality view 1300 may include an airspace. FIG. 14 is a chart related to the United States airspace system's classification scheme. Specifically, FIG. 14 illustrates various parameters related to one or more classes defined in the United States airspace system's classification scheme. The classification scheme is intended to maximize pilot flexibility within acceptable levels of risk appropriate to the type of operation and traffic density within that class of airspace—in particular, to provide separation and active control in areas of dense or high-speed flight operations. The Albert Roper (1919-10-13 The Paris Convention) implementation of International Civil Aviation Organization (ICAO) airspace classes defines classes A through G (with the exception of class F which is not used in the United States).

For an instance, a computing device (such as the computing device 1600) may analyze one or more parameters such as altitude, Visual Flight Rules (VFR), Instrument Flight Rules (IFR), VFR cloud clearance, and VFR minimum visibility etc. to determine an applicable airspace class. Further, the determined airspace class may be displayed on the virtual reality display. Further, the applicable airspace class may be determined using a location tracker such as a GPS and may be displayed as a notification on the virtual reality display.

Further, a special use airspace class may be determined. The special use airspace class may include alert areas, warning areas, restricted areas, prohibited airspace, military operation area, national security area, controlled firing areas etc. For an instance, if an aircraft (such as the civilian aircraft 1304) enters a prohibited area by mistake, then a notification may be displayed in the augmented reality view 1300. Accordingly, the pilot 1302 may reroute the aircraft towards a permitted airspace.

Further, the augmented reality view 1300 may include one or more live aircraft (representing real pilots flying real aircraft), one or more virtual aircraft (representing real people on the ground, flying virtual aircraft) and one or more constructed aircraft (representing aircraft generated and controlled using computer graphics and processing systems). Further, the augmented reality view 1300 shown to a pilot (such as the pilot 1302) in a first aircraft (such as the civilian aircraft 1304) may be modified based on sensor data received from another aircraft (such as another airplane 1310). The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

FIG. 15 shows an augmented reality view 1500 shown to a real pilot while a civilian aircraft 1502 is taxiing at an airport, in accordance with an exemplary embodiment. The augmented reality view 1500 may include one or more navigational markers (such as the navigation marker 1308) and signboards (such as a signboard 1504) that assist a pilot to taxi the civilian aircraft 1502 at the airport. The navigational markers may indicate the direction of movement. The signboards may indicate the speed limits.

The augmented reality view 1500 may help the pilot to taxi the civilian aircraft 1502 towards a parking location after landing. Further, augmented reality view 1500 may help the pilot to taxi the civilian aircraft 1502 towards a runway for taking-off. Therefore, a ground crew may no longer be required to instruct the pilot while taxiing the civilian aircraft 1502 at the airport.

Further, the augmented reality view 1500 may include one or more live aircraft (such as a live aircraft 1506) at the airport (representing real pilots in real aircraft), one or more virtual aircraft at the airport (representing real people on the ground, controlling a virtual aircraft) and one or more constructed aircraft at the airport (representing aircraft generated and controlled using computer graphics and processing systems). Further, the augmented reality view 1500 shown to a pilot in a first aircraft may be modified based on sensor data received from another aircraft. The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

Figure 16:
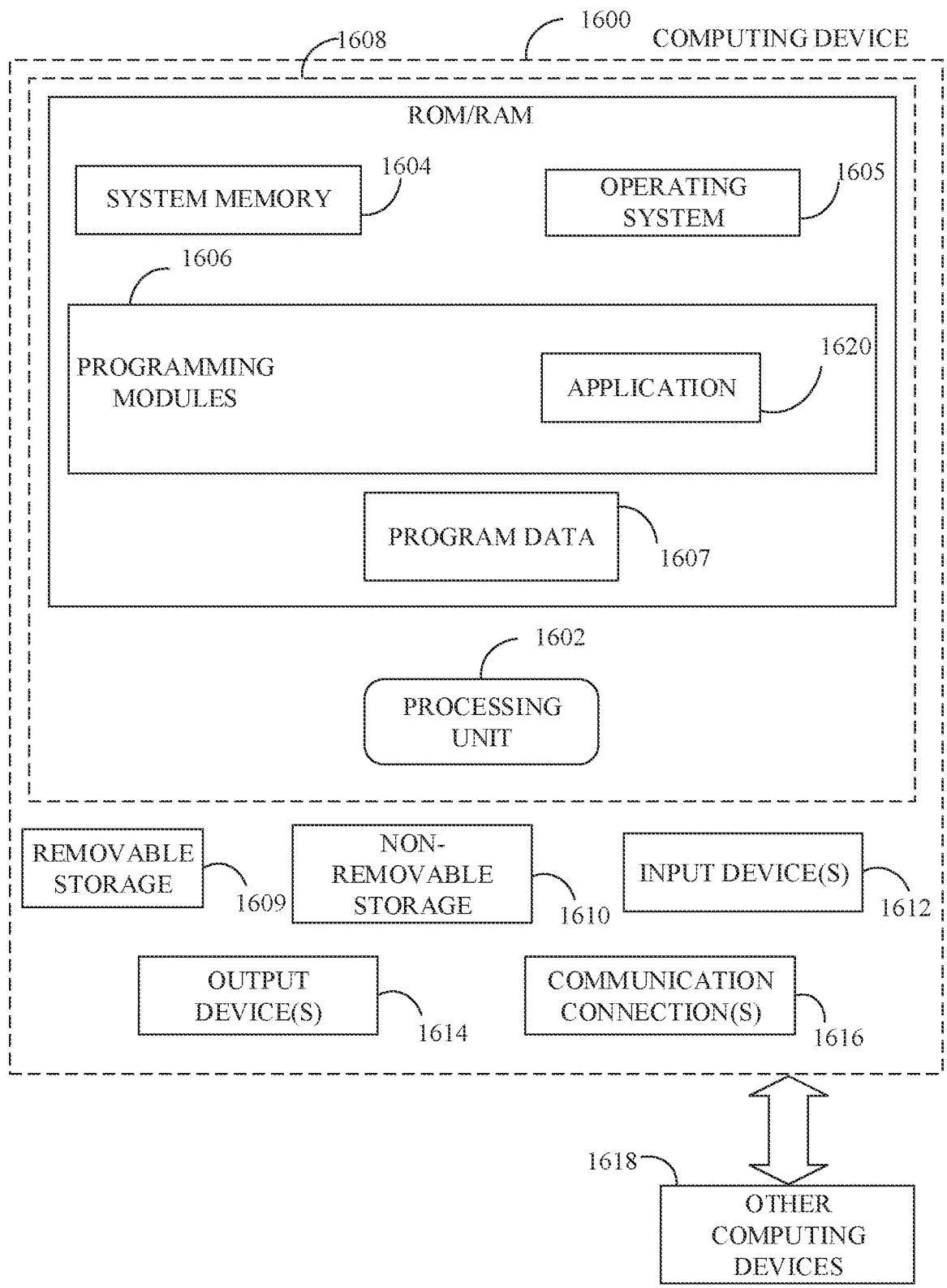
FIG. 16 is a block diagram of a computing device for implementing the methods disclosed herein, in accordance with embodiments of the present disclosure.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random-access memory (RAM)), non-volatile (e.g. read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include virtualization module, image-processing module, machine learning module and/or tracking module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and nonvolatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 (e.g., application 1620 such as a media player) may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include sound encoding/decoding applications, machine learning application, acoustic classifiers etc.

There are a number of ways to track aircraft and other vehicles. You can watch a vehicle move within your own local environment or in a longer-range environment with the aid of magnification. You can track things with radar when they are within visual sight or beyond visual sight. Radar systems may be local (e.g. within your vehicle) or remote (e.g. within another vehicle, on the ground separate, in the air, in space, etc.). Satellite imagery and other satellite sensor systems can track things. And other systems can be adapted to track vehicles, people and objects that are in a person's near environment or far from the person.

Military training exercises typically use a number of tracking technologies. In a situation where there are a number of real vehicles acting as enemies each vehicle may be equipped with tracking technologies to track the opponent. As the two vehicles (e.g. fighter jets) come within visual range of one another the pilot's will also likely track the opposition visually. This may be a practice dog fighting scenario. Each pilot would be able to track the opponent through all available tracking system, including her own vision. The inventors discovered that this places a significant burden on training exercises. There is a real risk of loss of life and loss of assets. There is a massive expense in operating assets in these training scenarios. The situations are limited to those of the skills of the individual pilots and other vehicle operators and restricted by the exercise rules. The rules may limit the participants from performing extreme maneuvers, for example, to minimize the risk to life and assets.

To incorporate more extreme conditions, preserve life and assets, save money, and train many more vehicle operators, ground based simulators are used for visual contact situations. Some ground-based simulators are very complex and can provide a near real feeling of being in a vehicle in certain situations, but they are limited because they are not in real vehicles and the simulations of a hostile cockpit environment, for example, is very difficult to accurately simulate. To simulate a turn at 5G's a ground-based simulator may move the operator and place pressure on the operator, but it is not like pulling 5G's in a real airplane. In the real jet fighter, the situation could go well above 5G's, risking the pilot to passing out and/or reduced cognitive ability, which greatly impact the pilot's ability to think and react.

Systems and methods according to the present disclosure use vehicle tracking and operator vision direction tracking as described herein to properly manage the presentation of virtual content within a real vehicle to simulate and augment the environment outside of the vehicle. Such systems and methods may further integrate non-visual tracking technologies. For example, a pilot in a fighter jet may have a radar system, whether local radar or other radar, to track assets out of visual range (e.g. approximately 10 miles away in a clear sky, much less in a cloudy sky). In a training simulation, the radar system may be presenting information not about another real vehicle but, rather, a virtual asset being controlled by a simulation system. The pilot may use the simulated radar information and maneuver the plane in a training exercise. This provides the pilot with the real environment of the cockpit while reacting in a simulation, which can provide a very good simulation with respect to non-visual tracking of assets.

In embodiments, the in-vehicle augmented reality system (e.g. HMD) simulation content is coordinated with non-visual tracking technologies. For example, a plane's radar system may indicate that an enemy plane is approaching at a fast rate and from a certain direction. When the enemy is more than 10 miles away, for example, the only indication the pilot may have of the enemy is the radar information. As the enemy approaches and comes within the pilot's visual range, the augmented reality system and simulation system may coordinate to 'hand off' the non-visual representation of the enemy to an augmented reality view of the enemy. The non-visual portion of the simulation may continue to provide information to the pilot is engaged in the augmented reality view. The transition from non-visual data to visual presentation of content is intended to be smooth and life like. For example, the size of the visual representation would be very small at the initial transition and it would follow the path indicated by the non-visual system. The tracking in the non-visual and virtual visual may coordinate throughout the visual range for the pilot such that she does not have any inconsistent input.

The non-visual and visual coordination may be generated, monitored, corrected, etc. in real time by a computer system. The computer system may be a central system that controls or influences the virtual environment and content presented to a vehicle operator or passenger. The computer system may be arranged to coordinate the simulated non-visual content that is presented to the operator of a vehicle with visual content that is presented to the operator such that the operator perceives the two information feeds as coordinated. The visual content would be displayed at a geospatial position and condition (e.g. perspective geometry) that is consistent with the simulated non-visual content's apparent location and condition (e.g. perspective geometry, location, speed, etc.).

In embodiments, coordination between non-visual information concerning another vehicle or object in a vehicle's environment may be representative of a real vehicle or object (e.g. radar tracking and presentation of another airplane or missel more than 10 miles away). Once the real object enters the vehicle operator's visual range, virtual visual content may be presented to the operator in his see-through optical system as augmented reality content. The virtual content may provide the operator with information pertaining to the other vehicle or object and/or cues to guide the operator with respect to the other vehicle or object.

A system and method according to the principles of the present invention may be an augmented reality system for the training of vehicle operators involving visual and non-visual information. It may involve a head-mounted see-through optic (e.g. HMD) adapted to present digital content viewable by a user and having a transparency that allows the user to see though to the surrounding environment. It may also involve a non-visual tracking system adapted to identify and track objects in a surrounding environment that cannot be seen visually. A training simulation system may be adapted to present a virtual training object on a display on the non-visual tracking system and virtual visual content in the see-through optic. Both the displays, HMD and non-visual display, may be representing a location and movement of the same training object and the presentation may be coordinated such that both displays indicate the training object is in the same position.

A system and method according to the principles of the present invention may involve tracking and coordinating visual information and non-visual information relating to a virtual object in a training simulation. This may involve providing a non-visual object tracking system in a vehicle and providing an augmented reality see-through computer display adapted to present virtual content representing an object to an operator of the vehicle. A training simulation system may generate a geospatial location and path of movement of the virtual object at a geospatial location outside of a visual range of the operator. The geospatial location and path of movement of the virtual object may be displayed on the non-visual object tracking system while the object maintains a distance from the vehicle that is outside of the operator's visual range. The system may present a representation of the virtual object in the operator's see-through computer display when the location of the object enters the operator's visual range. The representation may be presented at a position within a field of view of the see-through computer display that is consistent with the position of the object as presented on the display of the non-visual object tracking system.

In embodiments, the non-visual tracking system may be a radar tracking system. In embodiments, the virtual object may be an enemy asset.

In embodiments, the step of presenting the virtual object on the display of the non-visual object tracking system may be part of a simulated training exercise where the computer simulation system generates the virtual object and determines the virtual objects path of movement. The system may coordinate a substantially simultaneous presentation of the visual representation of the virtual object and the non-visual representation of the virtual object. In embodiments, the step of coordination involves alignment of the geospatial location and direction of movement consistent in the see-through computer display and the non-visual display.

Systems and methods according to the principles of the present inventions involve replaying live simulated training sessions. A live simulated training session may involve a real vehicle operating in a real environment (as described herein) and an operator's and or vehicle's reactions to a virtual object presented as if within visual range. The content may be presented as augmented reality content to the operator. In embodiments, such a system and method may involve saving in-flight data from an aircraft during a simulated training exercise, wherein the in-flight data includes geospatial locations of the aircraft, positional attitudes of the aircraft, and head positions of a pilot operating the aircraft. It may further involve saving simulation data relating to a simulated virtual object presented to the pilot as augmented reality content in-flight, wherein the virtual object was programmed to interact with the aircraft during the simulated training exercise. With the relevent data from the augmented reality simulated training saved, the system may represent the in-flight data from the aircraft and the simulation data relating to the simulated virtual object as a replay of the simulated training exercise. The replay may be reviewed in real time, slow motion, fast forward, etc. to understand or teach lessons based on the training session.

Systems and methods described herein can be used to create a virtual environment presented to an operator or a passenger in a real operating vehicle. As disclosed herein, the virtual environment may be used for a variety of uses (e.g. combat training, operational training, navigation guidance, visual cues for situations occurring during operation). The virtual environment may be generated and/or controlled in-part or entirely by an artificial intelligence system, machine learning system, deep learning system, etc. (AI). For example, simulations of situations may have been completed in on-ground simulation systems or live vehicle systems and the operator performance in those simulations may affect the control of virtual objects in the in-vehicle virtual environment. For example, if a pilot usually turns the plane, his eyes, or his head in a certain direction in a certain situation, the AI may control or influence the content to try to cause the pilot to turn his head or change something to cause some response.

As has been described herein, systems and methods disclosed herein may be used for training, gaming, cueing an operator or passenger during training or in a non-simulated, live, situation, coordinating information amongst various participants (e.g. keeping vehicles in a formation), etc. While many of the embodiments herein describe training simulations it should be understood that the principles of the present inventions may relate to cueing an operator in a live situation.

With the introduction of systems and methods of visual cueing and training, the inventors discovered that the systems and methods may be used to generate and analyze an entirely new data type relating to feedback from the in-vehicle situations. For example, a pilot may be in a real jet fighter flying at the speed of sound using an augmented reality system as described herein. The system may present visual content to the pilot in augmented reality causing a response by the pilot and the response, biomarkers from the pilot or passenger, results of the response, etc. may be recorded, stored and analyzed by a computer system. The data may be used to train an AI system, form trend analysis for a group of people in similar situations, form personal trend analysis for individual pilots or passengers, identify reaction times for the pilot and the vehicle, form a trend analysis of the vehicle's conditions through real maneuvers, etc. Models, trends, situational reactions from the analysis can be used to train groups of vehicle operators, individual vehicle operators, provide trainers feedback, modify virtual environments and content in simulations and/or the control of the content in simulations, modify cues presented to operators in non-simulated, live, situations, etc. Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

We claim:

1. A method of presenting a coordinated training scenario to two or more vehicles in separate airspaces where the two or more vehicles are not within visual range of one another, comprising:

presenting a common virtual airspace to the two or more vehicles, wherein the common virtual airspace includes a computer generated training asset that is viewable by an operator of each vehicle as content overlaying a real airspace surrounding each of the respective vehicles;

identifying a geospatial location for each of the two or more vehicles within the virtual airspace;

positioning the computer generated training asset at a geospatial location within the virtual airspace within a visual range of the two or more vehicles such that the perspective of the computer generated training asset is separately based on the geospatial location for each of the two or more vehicles; and presenting a first pilot of a first vehicle, of the two or more vehicles, with computer generated content representing a second vehicle, of the two of more vehicles, when the first pilot looks in the direction of the second vehicle's geospatial location;

wherein the presenting of the computer generated content representing the second vehicle is further based, at least in part, on an unobstructed line of sight between the first pilot and the computer content representing the second vehicle;

wherein the apparent relative position between the first vehicle and the computer generated content representing the second vehicle is based, at least in part, on the actual movements of the first vehicle and a second vehicle; and wherein the computer generated training asset and the computer generated content representing the second vehicle move separately within the virtual environment, the second vehicle representation based on the actual movement of the second vehicle and the training asset based on a computer generated path intended to interact with at least one of the two or more vehicles.

2. The method of claim 1, wherein the geospatial boundaries of the virtual airspace are set such that each of the two or more vehicles operate within respectively clear airspace.

3. The method of claim 1, wherein the common virtual airspace represents one of the two or more vehicle's actual airspace.

4. The method of claim 1, wherein the common virtual airspace represents an airspace in an enemy environment.

* * * * *